United States Patent [19]

Hirofumi et al.

[11] Patent Number: 5,840,441
[45] Date of Patent: Nov. 24, 1998

[54] BATTERY CAN, SHEET FOR FORMING BATTERY CAN, AND METHOD FOR MANUFACTURING SHEET

[75] Inventors: Sugikawa Hirofumi; Michibata Sachio; Hayashi Keiichi, all of Osaka, Japan

[73] Assignee: Katayama Special Industries, Ltd., Osaka-fu, Japan

[21] Appl. No.: 373,438

[22] Filed: Jan. 17, 1995

Related U.S. Application Data

[62] Division of Ser. No. 187,000, Jan. 27, 1994.

[30] Foreign Application Priority Data

| Jun. 4, 1993 | [JP] | Japan | 5-134987 |
| Jun. 4, 1993 | [JP] | Japan | 5-134988 |
| Jun. 4, 1993 | [JP] | Japan | 5-134989 |
| Jun. 4, 1993 | [JP] | Japan | 5-134990 |

[51] Int. Cl.$^6$ ................................. H01M 2/04
[52] U.S. Cl. .................. 429/176; 429/164; 429/166; 429/168
[58] Field of Search .................. 429/164, 166, 429/168, 176

[56] References Cited

U.S. PATENT DOCUMENTS

| 5,069,989 | 12/1991 | Uetani et al. | 429/164 |
| 5,078,809 | 1/1992 | Kinoshita et al. | 148/12 C |
| 5,336,567 | 8/1994 | Watanabe et al. | 428/629 |

FOREIGN PATENT DOCUMENTS

| 0173906 | 3/1986 | European Pat. Off. |
| 0524098 | 1/1993 | European Pat. Off. |
| 3229246 | 2/1983 | Germany. |

OTHER PUBLICATIONS

*Patent Abstracts of Japan,* unexamined applications, E section, vol. 17, No. 289, Jun. 3, 1993, p. 130 E 1375 (JP-A-5 21 044).

Katayama et al, Battery can and forming material thereof, Jan. 29, 1993, Abstract.

*Primary Examiner*—John Niebling
*Assistant Examiner*—Bruce F. Bell
*Attorney, Agent, or Firm*—Wenderoth, Lind & Ponack

[57] ABSTRACT

A steel plate having a plated layer on the upper and lower surfaces thereof to be processed into a battery can which is cylindrical and open in one end thereof by drawing and ironing processing. The plated steel plate has more than 1.2 as a Lankford value (r) which is a width deformation degree in a lengthwise direction thereof/a thickness deformation degree in the lengthwise direction thereof, a width deformation degree in a widthwise direction thereof/a thickness deformation degree in the widthwise direction thereof, a width deformation degree in an oblique direction thereof/a thickness deformation degree in the oblique direction thereof. In-plane anisotropy Ar which is the difference among the Lankford values (r) is set to be less than ±0.15 so that the elongation coefficient of the plated steel plate in lengthwise, widthwise, and oblique directions is almost constant, i.e., so that the generation of earring can be prevented in drawing and ironing a sheet comprising the steel plate into the battery can. In order to make the elongation coefficient of the plated steel plate constant in the three directions, a very low carbon steel plate is used. The steel plate is cold-rolled at 80–90%. The plated layer is allowed to have a granular structure by annealing it after it is plated.

8 Claims, 21 Drawing Sheets

BATTERY CAN, SHEET FOR FORMING BATTERY CAN, AND METHOD FOR MANUFACTURING SHEET

This is a divisional of application Ser. No. 08/187,000, filed Jan. 27, 1994.

BACKGROUND OF THE INVENTION

1. Field of the Invention

The present invention relates to a battery can to be processed by drawing and ironing, a sheet for forming the battery can, and a method for manufacturing the sheet.

2. Description of the Related Arts

Normally, a cylindrical battery can comprises a closed surface, which is disposed at one end thereof and serving as a positive side and an opening portion, which is disposed at the other end thereof and serving as a negative side, on which a cover is installed. The battery is manufactured by progressive pressing method as shown in FIG. 1.

According to progressive pressing method, a coiled steel sheet S to be processed into battery cans is punched into a plurality of circular substrates M. Deep drawing is performed on each of the substrates M to form a cylindrical wall M-2 vertically on the peripheral surface of a bottom surface M-1 as shown in FIG. 1. Then, deep drawings are repeatedly performed in 8–12 processes to manufacture a cylindrical pipe to be used as a battery can having a required depth and diameter.

In the progressive pressing method, the cylindrical wall M-2 is drawn so that the thickness of the cylindrical wall M-2 becomes almost equal to that of the bottom surface M-1. Therefore, when the sheet S is drawn at 0.25 μm, the thickness of the cylindrical wall of a battery can becomes approximately 0.24 μm. Because the outer diameter of the battery can is regulated, preferably, the thickness of the battery can is formed to be as small as possible to make the inner diameter thereof large so that the space in the battery can is great, i.e., a greater amount of filler can be supplied to the battery can so as to increase the electric power of a battery.

In the conventional progressive pressing method, however, the thickness of the cylindrical wall and the bottom wall are reduced to the same percentage and yet it is necessary to make the thickness of the bottom wall larger than a required thickness. That is, it is difficult to reduce only the thickness of the cylindrical wall greatly. Accordingly, it is difficult for the conventional progressive pressing method to increase the electric power of the battery because a large amount of filler cannot be charged in the space of the battery. In addition, it is also difficult to reduce manufacturing cost because many processes are required to manufacture the battery can.

Drawing and ironing process method as shown in FIG. 2 has been recently developed as a method for manufacturing the battery can. According to this method, a steel sheet S is drawn and punched into substrates M in the form of shallow cylindrical cups each having a bottom wall M-1 and a cylindrical wall M-2 and each cup is processed into a cylindrical configuration having a required depth and diameter by a subsequent deep drawing process.

In deep-drawing the cup by using the above drawing and ironing process, only the cylindrical wall is drawn. Therefore, the thickness of the cylindrical wall can be reduced to 0.18 mm, whereas the thickness of the bottom wall is 0.4 mm. That is, thickness-reducing percentage is a little more than twice as great as that of conventional percentage. Therefore, a greater volume of the space of the battery cup can be provided. Thus, a greater amount of filler can be supplied into the space of the battery can. In this manner, the electric power of the battery can can be increased.

In addition, the battery can can be manufactured by only two processes. That is, the battery can be manufactured by only the process of drawing and punching the steel sheet S into cups and the process of deep-drawing the cups. Therefore, the battery can can be manufactured by a much smaller number of processes and thus at a low cost.

But the above-described deep-drawing method has the following problems. That is, in the progressive pressing method, the substrate M is drawn gradually in 8–12 processes without taking elongation coefficient (in-plane anisotropy) in lengthwise, widthwise, and oblique directions into consideration.

That is, in the above-described deep-drawing method, as shown in FIG. 3, the height of the cylindrical wall is not uniform, i.e., the highest portion A of the wall M-2 is higher by approximately 5 mm the than the lowest portion B thereof. That is, earring occurs if elongation coefficients in lengthwise, widthwise, and oblique directions are different from each other and if the thickness of a material steel sheet is not uniform. The earring is generated in cupping process and the difference between the highest portion of the wall and the lowest portion thereof becomes large in deep drawing process.

When strain is applied to a steel sheet in rolling direction (lengthwise direction X) as shown in FIG. 4 in such a manner that the steel sheet elongates within a uniform elongation coefficient, let it be supposed that the width and thickness of the steel sheet before deformation occurs in lengthwise direction X are $W_{x0}$ and $t_{x0}$, and the width and thickness of the steel sheet after deformation occurs in lengthwise direction X are $W_x$ and $t_x$, anisotropy (Lankford value $r_x$) of deformation with respect to force acting in the rolling direction is expressed by the following equation (1):

$$r_x = \ln(W_x/W_{x0})/\ln(t_x/t_{x0}) \tag{1}$$

The Lankford value $r_y$ of force acting in widthwise direction Y and that $r_z$ of force acting in oblique direction Z forming 45° with the lengthwise direction X are expressed similarly to the equation (1). In-plane anisotropy (Δr) among lengthwise direction X, widthwise Y, and oblique direction X is expressed by the following equation (2):

$$\Delta r = (r_x + r_y)/2 - r_z \tag{2}$$

Experiments conducted by the present inventors indicate that the generation percentages of the earring are different from each other depending on the Lankford value r and the in-plane anisotropy Δr.

That is, the generation percentage of earring is high unless the Lankford value r is more than a predetermined value and if the absolute value of the Δr is great. Earrings are formed as follows: Projections, namely, so-called an earring is formed at four points at an interval of 90° on the upper end of the cylindrical wall of the battery can. If the in-plane anisotropy Δr is positive, projections are generated at 0° and 90° in lengthwise direction X. If the in-plane anisotropy Δr is negative, projections are generated at 45° in lengthwise direction X. When the absolute value of the in-plane anisotropy Δr approaches 0, six earrings are generated, i.e., the difference between the highest portion of the wall and the lowest portion of the wall of the battery can becomes smaller.

Supposing that the highest position of earring is A, the lowest position is B, and the required lowest position is C as shown in FIG. 3, it is necessary to cut the cylindrical wall at the lowest position B. As a result, the length between the bottom surface and the position B is short by the length between the position B and the position C.

If the steel sheet is drawn so that the length of the cylindrical wall is longer, i.e., the position B is higher than the position C, the length between the position A and the position C is greater. In this case, the sheet is wastefully consumed.

In order to prevent the generation of earring, it is necessary to make the Lankford value r in each of the lengthwise direction, the widthwise direction, and the oblique direction more than a predetermined value and in addition, make the in-plane anisotropy $\Delta r$ found by the difference among the Lankfoad values approach zero. But it is very difficult to do so.

It is well known that when a material steel plate is rolled, the center portion thereof in the widthwise direction becomes greater and both edge portions thereof become smaller and hence the material steel plate is not rolled uniformly widthwise. When a sheet punched from the steel plate having a nonuniform thickness or a sheet punched from edge portion of such a steel sheet is deep-drawn, the non-elongation coefficient of the sheet is nonuniform and thus the generation percentage of earring is high.

In forming the sheet into the battery can by drawing and ironing processing, cracks are likely to occur at the boundary, to be bent, between the bottom wall and the cylindrical wall of the battery can unless the sheet has a high ductility. As a result, the battery can is not corrosion-resistant.

In the above-described progressive pressing processing, the surface roughness of a sheet is high because the sheet is drawn gradually in many processes, whereas in the drawing and ironing processing, the surface roughness of the sheet is low and the surface thereof becomes smooth like a mirror surface because the thickness of the sheet is reduced to approximately ½ of the original thickness in two processes. That is, in the drawing and ironing processing, the inner surface of the cylindrical wall of the battery can, which contacts filler, becomes smooth like a mirror surface and thus has a high contact resistance and the battery is thus deteriorated in its electrical performance.

Preferably, the inner surface of the cylindrical wall of the battery can has a high surface roughness so as to reduce the contact resistance to increase its electrical performance, whereas preferably, the outer surface of the cylindrical wall of the battery can has a low surface roughness, namely, a smooth surface like a mirror surface because the outer surface of the cylindrical wall is corrosion-resistant and looks fine in its appearance.

As apparent from the foregoing description, in selecting the steel sheet, the most important point is property of thickness-reduction percentage namely, it is most important that the thickness thereof can be reduced at more than a predetermined percentage and the second most important requisite is that the inner surface of the cylindrical wall of the battery can has a great surface roughness affecting the electrical characteristic of the battery can and in addition, the outer surface of the cylindrical wall has a favorable corrosion-resistant performance and brightness.

The thickness-reduction percentage of the wall of the battery can, corrosion-resistant property of the inner surface of the wall, and brightness of the outer surface of the battery can are correlative to each other. More specifically, the more favorable thickness-reduction percentage is, the worse the electrical battery characteristic is, and vice versa.

More specifically, in using a sheet comprising a 5–6 $\mu$m thick Fe—Ni diffusion layer formed on each surface of the steel sheet and a nickel-plated layer formed on each Fe—Ni diffusion layer, the Fe—Ni diffusion layer to be disposed on the inner surface of the cylindrical wall of the battery can is thick and hard. As a result, the nickel-plated layer are cracked like wedges in drawing and ironing processing. The cracks affects favorably in the electrical performance of the battery can because the contact resistance of the inner surface to filler which is supplied into the battery can and is brought into contact with the inner surface is low. But the sheet cannot be drawn favorably, i.e., earring is generated on the upper end of the wall of the battery can. In addition, because the outer surface of the wall of the battery can is as thick as 5–6 $\mu$m, cracks are likely to be generated on the outer surface in drawing and ironing processing.

The conventional steel sheet to be processed into the battery can by the drawing and ironing processing comprises a low carbon steel containing carbon at 0.04–0.05 wt %. The steel sheet is manufactured by the method as shown in FIG. 5.

That is, at step #1 slab is hot-rolled, and at step #2, the hot-rolled steel plate is cold-rolled. At step #3, the non-annealed cold-rolled steel plate is batch-annealed, and at step #4, refining rolling is carried out. A step #5, the upper and lower surfaces of the steel plate is plated. Thereafter, continuous annealing and refining rolling are performed on the plated steel plate at step #6 and step #7, respectively. Then, the steel plate is plated at step #8.

In the above conventional manufacturing method, however, batch annealing (step #3) has the following disadvantages:

In the batch annealing, steel sheets S' are annealed in an annealing oven W by piling them one on the other in a hoop configuration. Therefore, in order to prevent them from being coalesced with each other and thus damaged, it is necessary to apply sodium silicate to the surface of each steel sheet S' to form a film thereon. But when the film of sodium silicate has been broken, the film becomes powders and in addition, iron powders are generated, thus causing the surface of the steel sheet to deteriorate. In particular, when iron powders have adhered to the surface of a roll for rolling the steel sheet (step #4), iron powders are transferred to the steel sheet.

In addition, as shown in FIG. 7, the steel sheet S' is heated at 550°–600° C. for an hour and the temperature is maintained at 550°–600° C. for 2–10 hours. Then, the steel sheet S' is gradually cooled to 100° C. in 23–33 hours. Therefore, the period of time required from the start of annealing until the take-out of the steel sheet S' from the oven W is as long as about 36 hours, which causes manufacturing cost to be high.

Further, because the steel sheets S' are annealed in a hoop configuration, heat is not uniformly distributed to the steel sheet S' and hence it is difficult to anneal them uniformly.

In the continuous annealing to be performed at step #6, the steel sheet is annealed while it is being transported by rolls. Therefore, it is unnecessary to apply sodium silicate to the surface of the steel sheet S' to form a film thereon and heat is uniformly distributed to the steel plate S'. In the continuous annealing, as shown in FIG. 8, the steel sheet S' is rapidly heated to 600°–900° C. for a minute, and the temperature is maintained at 600°–900° C. for 30 seconds. Then, the steel sheet is cooled to 400° C. in 20 seconds, and then, over-aging processing is performed for 150 seconds.

Thereafter, the steel sheet S' is rapidly cooled to 100° C. in 15 seconds. Thus, the period of time required from the start of the continuous annealing until the take-out of the steel sheet S' from the oven W is as short as about five minutes.

Continuous annealing cannot be performed in the case of low carbon steel containing carbon at 0.04–0.05 wt % at step #3 instead of batch processing for the following reason:

That is, at the room temperature, α solid solution (ferrite) and $Fe_3C$ (pearlite) are in a mixed state in the low carbon steel. When the low carbon steel has not been annealed, cementite (carbon atoms A) in ferrite tends to concentrate on a dislocation portion D as shown in FIG. 9. When an external force is applied to the steel plate, the dislocation portion D moves along a sliding surface X. As a result, resistance generated by cementite is added to the resistance to the movement of the dislocation portion D, so that cementite has concentrated on the dislocation portion D. Consequently, yield point elongation Y1 is generated as shown in FIG. 10A. Stretcher strains are generated on the surfaces of the battery can 1' as shown in FIG. 11 when a steel sheet having the yield point elongation Y1 is drawn and ironed. In particular, because the top surface 1a' of the battery can 1' is exposed to the outside, the presence of the stretcher strain on the top surface 1a' of the battery can 1' is commercially defective.

When the low carbon steel is heated, cementite becomes a super-saturated solid solution and thus re-solidified. Therefore, the yield point elongation Y1 disappears as shown in FIG. 10B when annealing and refining rolling are carried out. The steel plate is heated rapidly and cooled in continuous annealing as described above. Accordingly, strain is not completely removed from the steel plate by re-crystallization. Consequently, the yield point elongation Y1 (time-aging) is generated again as shown in FIG. 10C with the elapse of time. In batch annealing, because the steel sheet is gradually heated and cooled and thus crystal having no strain is formed namely, aging does not occur. For the reason described above, in order to prevent the generation of stretcher strain, continuous annealing is inappropriate for annealing the cold-rolled plate. Thus, batch annealing cannot but be adopted for low carbon steel containing carbon at 0.04–0.05 wt %.

The above-described drawing and ironing processing has the following disadvantage because the thickness of the steel sheet is reduced to approximately ½ of the original thickness thereof by a die shown in FIG. 12: That is, the friction coefficient of the peripheral surface 51a of a cup 51 made of a sheet to be processed into the battery can 1 and that of the surface 52a of a die 52 which slidingly contacts the peripheral surface 51a are very great. Similarly, the friction coefficient of the inner surface 51b of the cup 51 and that of the outer surface 53a of a punch 53 which slidingly contacts the inner surface 51b are very great.

Accordingly, the longevity of the die 52 and that of the punch 53 become very short. In addition, a great force is required to separate the punch 53 and the punched battery can from each other.

Normally, lubricating oil is applied to the upper and lower surfaces of a sheet to be processed into the battery can before a blanking processing is carried out. Because the upper and lower surfaces of the sheet is smooth, lubricating oil is apt to drop therefrom and often decreases or is exhausted before or when the drawing and ironing processing is carried out after the blanking processing and cupping processing are performed.

Lubricating oil may be supplied to the periphery of the hole of the die and the outer surface of the punch. But because the thickness of the material sheet is reduced to a great extent, lubricating oil is exhausted soon. As a result, it is necessary to supply lubricating oil frequently to the periphery of the hole of the die and the outer surface of the punch. That is, operational performance is low.

SUMMARY OF THE INVENTION

It is accordingly an object of the present invention to provide a sheet, to be processed into a battery can, having an elongation coefficient constant in the longitudinal, width, and oblique directions thereof in order to prevent or reduce the generation of earring in drawing and ironing processing.

It is a second object of the present invention to provide a sheet, to be processed into a battery can, which has a high surface roughness on a surface corresponding to the inner surface of the cylindrical wall of the battery can and a small surface roughness on a surface corresponding to the outer surface of the cylindrical wall of the battery can so that the outer surface has a high corrosion-resistant property and is fine in its external appearance and which is suitable for drawing and ironing processing.

It is a third object of the present invention to provide a sheet, to be processed into a battery can, having a high ductility to prevent cracks from being generated cracks on the cylindrical wall of the battery can and improve corrosion-resistant property.

It is a fourth object of the present invention to provide a steel sheet in which aging of strain does not occur so as to accomplish continuous annealing and reduce manufacturing period of time and cost.

It is a fifth object of the present invention to provide a sheet, to be processed into a battery can, having a rough surface so as to hold lubricating oil thereon reliably so that a drawing die has a long life and drawing and ironing processing can be performed at a high speed.

In carrying out the present invention, there is provided a battery can comprising a cylindrical wall and a bottom surface disposed at the other end thereof, and formed by drawing and ironing, wherein the cylindrical wall and the bottom surface have a plated layer formed on each surface thereof, and elongation coefficients in lengthwise, widthwise and oblique directions of the plated steel sheet are predetermined approximately uniform. It is preferable that the plated steel sheet has more than 1.2 as a Lankford value (r) which is a width deformation degree in a lengthwise direction thereof/a thickness deformation degree in the lengthwise direction thereof, a width deformation degree in a widthwise direction thereof/a thickness deformation degree in the widthwise direction thereof, a width deformation degree in an oblique direction thereof/a thickness deformation degree in the oblique direction thereof; and in-plane anisotropy Ar which is the difference among the Lankford values (r) is set to be less than ±0.15 so that the elongation coefficient of the plated steel plate in lengthwise, widthwise, and oblique directions is almost constant.

In carrying out the present invention in still another preferred mode, there is provided a steel sheet which is to be processed into a battery can by drawing and ironing. An upper and lower surface of a steel base plate are plated, and elongation coefficients in lengthwise, widthwise and oblique directions of a plated sheet are predetermined approximately uniform. As the elongation coefficient of the plated steel sheet is almost uniform in the lengthwise, widthwise, and the oblique directions thereof, the thickness of the sheet can be favorably reduced and in addition, earring is not generated on the upper end of the cylindrical wall of the battery can. Preferably, the sheet comprises a cold-rolled low carbon steel plate containing carbon at less than 0.009 wt % and a plated layer formed on the upper and lower surface of the steel plate.

The sheet is manufactured by the step of hot-rolling a slab, then the step of cold-rolling at rolling percentage 80–90 according the kind of steel. Further, the cold-rolled steel is annealed continuously so that the non-annealed cold-rolled steel plate contains carbon at a very small percentage by weight i.e., less than 0.009 wt %, then the plated layers on the upper and lower surfaces of the steel plate are formed.

It is possible to continuously anneal the non-annealed cold-rolled steel plate after forming the plated layers on the upper and lower surfaces of the steel plate.

The very low carbon steel plate containing carbon at less than 0.009 wt % does not age and thus a yield point elongation does not occur after annealing processing is carried out. Accordingly, the sheet of the present invention having the plated layers formed on the very low carbon steel plate can be continuously annealed after it is cold-rolled. Thus, the sheet can be manufactured in a short period of time.

Because the yield point elongation does not occur after annealing processing is carried out, stretcher strain is not generated and hence, the battery can look fine.

The plated layer formed on the upper or lower surface of the rolled steel plate is a hard plated layer which is cracked in both surfaces thereof in drawing and ironing processing.

Preferably, a bright plated layer is formed on a surface of the steel plate to be disposed on the outer surface of the cylindrical wall of the battery can.

Preferably, a hard plated layer is formed on one surface of the steel plate via a Fe—Ni diffusion layer, and a Fe—Ni diffusion layer is formed on the other surface of the steel plate. It is possible to impart brightness on the surface of the Fe—Ni diffusion layer to be disposed on the outer surface of the cylindrical wall of the battery can depending on pressure-reducing condition in performing refining rolling. In this case, the bright plated layer may not be formed on the surface of the Fe—Ni diffusion layer.

According to the above construction, the hard nickel plated layer is formed on one surface of the steel plate to be disposed on the inner surface of the cylindrical wall of the battery can in drawing and ironing processing. Therefore, many cracks can be generated on the hard plated layer in drawing and ironing processing.

As above-mentioned, the bright plated layer is formed on the surface of the steel plate to be disposed on the outer surface of the cylindrical wall of the battery can. The thin Fe—Ni layer is formed between the bright plated layer and the steel plate and between the hard plated layer and the steel plate. Thus, the battery can is corrosion-resistant and the outer surface of the cylindrical wall of the battery can is bright.

In carrying out the present invention in a preferred mode, there is provided a method for manufacturing a steel sheet to be processed into a cylindrical battery can which is open in one end thereof and formed by drawing and ironing, comprising the steps of: hot-rolling casted slab to form a steel plate; cold-rolling the steel plate at a rolling percentage of 80–90 according to the kind of steel; making the elongation coefficient of the cold-rolled plate almost uniform in a lengthwise direction which corresponds to a rolling direction, a widthwise direction perpendicular to the lengthwise direction, and an oblique direction; and plating the upper and lower surfaces of the cold-rolled plate.

Preferably, the steel plate is cold-rolled at a rolling percentage of 83–88 when the metallic structure of the steel plate is composed of equiaxial grains in the widthwise direction thereof.

Both sides of the plate in the width direction thereof are cooled faster than the center portion of the steel plate in coiling the sheet in the hot rolling. As a result, aluminum nitride is not precipitated but solidifies. As a result, the metallic structure on both sides of the plate is composed of drawn grains while the metallic structure of the center portion thereof is composed of equiaxial grains. Therefore, in this case, cold rolling is performed by raising the cold-rolling percentage a little, namely, setting to 83–88.

Preferably, in hot rolling, the steel plate is hot-rolled at the above-described rolling percentage 83–88 by heating both sides of the steel plate in the width direction thereof by heating means so that the metallic structure thereof is composed of equiaxial grains in the width direction thereof.

Preferably, the axes of a pair of work rolls which contacts the steel plate being cold-rolled form a predetermined angle so as to make the thickness of the steel plate uniform in the width direction thereof.

After the steel plate is cold-rolled, the steel plate is annealed at a required temperature for a required period of time according to the kind of steel; and refining rolling is performed at a required rolling percentage depending on the kind of steel.

The annealing and the refining rolling are performed before and/or after the plating step is performed depending on the kind of steel.

The upper and lower surfaces of the cold-rolled plate is plated with nickel.

Preferably, the plated layer to be formed on both surfaces of the cold-rolled steel plate has a granular structure.

In carrying out the present invention in another preferred mode, there is provided a method for manufacturing a sheet to be processed into a cylindrical battery can comprising the steps of: plating the upper and lower surfaces of a non-annealed cold-rolled steel plate with nickel; annealing the steel plate to change the structure of the nickel-plated layer from an acicular structure to a granular structure, form a Fe—Ni diffusion layer between the cold-rolled steel plate and both nickel-plated layers, and allow the metallic structure of Fe to have a granular structure.

Preferably, the nickel-plated layer is formed in a thickness of 2 $\mu$m–5 $\mu$m; and then annealed at 600° C.–900° C. for 0.5–2 minutes.

After the annealing is performed, refining rolling is performed at a pressure-reducing percentage of 0.5–2.0 so as to increase the toughness of the nickel-plated layer by making the granular structure recrystallized by the continuous annealing fine.

Normally, the metallic structure of the soft nickel-plated layer electro-deposited on both surfaces of Fe steel plate is composed of acicular structure by nickel-plating a non-annealed cold-rolled steel plate. The nickel-plated layer having an acicular structure is not preferable in ductility and thus a portion to be curved, namely, the boundary between the cylindrical wall and the bottom surface of the battery can is likely to be cracked and not preferable in corrosion-resistant performance.

Owing to the change from the acicular structure of the nickel-plated layer to the granular structure thereof by effecting the continuous annealing, ductility becomes preferable and thus a portion, to be curved, of the sheet are not cracked and moreover, the corrosion-resistant property of the nickel-plated layer can be improved.

In addition, the Fe—Ni diffusion layer is formed between the cold-rolled steel plate and each nickel-plated layer, and the metallic structure of Fe is recrystallized and hence granular structure is formed. In this manner, the granular structure formed by the recrystallization allows the plated steel plate to have a Lankford value (r) at more than 1.2 and allows in-plane anisotropy Δr which is the difference among the Lankford values (r) to be less than ±0.15. Owing to this construction, the generation of earring can be prevented greatly, i.e., the battery can is formed to be constant in the height of the cylindrical wall thereof.

Preferably, the roughness (Ra) of the surface of the plated layer formed on the upper and lower surfaces of the cold-rolled plate is 0.5 μm–1.2μm.

That is, the surface of the cold-rolled plate is roughened so that the roughness (Ra) of the surface thereof is 0.5 μm–1.2 μm; and a nickel-plated layer is formed in a uniform thickness on the surface of the cold-rolled plate so that the roughness (Ra) of the surface of the nickel-plated layer is 0.5 μm–1.2 μm.

Preferably, a nickel-plated layer is formed on the surface of the cold-rolled plate; and then, refining rolling is performed by means of a surface-roughened dull roll so that the roughness of the surface of the nickel-plated layer is 0.5 μm–1.2 μm.

The surface roughness (Ra) indicates the average roughness of a center line. Referring to FIG. 13, a measurement length L is extracted from a roughness curve in the direction in which the center line extends. Supposing that the center line of the extracted portion is X-axis, the direction of a longitudinal magnification is Y-axis, and a roughness curve is expressed by y=f(x), the surface roughness (Ra) is expressed in μm found by the following equation.

$$Ra = 1/L \int_0^1 |f(x)|dx$$

The surface roughness of a conventional sheet to be drawn and ironed is normally 0.1 μm at the maximum.

In order for the steel plate to have the above-described surface roughness, the surface of a rolling roll is polished with a grindstone or surface roughness of the roll is made to be great by shot blast method so that the surface roughness of the roll is transferred to the steel plate in rolling. Otherwise, after the surface of the steel plate is nickel-plated, refining rolling is performed by a dull roll having a roughened surface thereon so as to increase the surface roughness of the nickel-plated layer.

The roughness-increased surface, namely, area-increased surface of the steel sheet allows a larger amount of lubricating oil to be applied thereto and functions as an oil reservoir. That is, the steel sheet has a high oil-reserving performance.

Because the sheet comprising the steel sheet has a sufficient amount of lubricating oil thereon, in drawing and ironing process, the friction coefficient of the sliding-contact surface between the die and the punch can be reduced, thus prolonging the life of die and the punch and improving productivity.

The life of die and the punch can be further prolonged by applying lubricating oil to the surface of the sheet in the drawing and ironing process.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
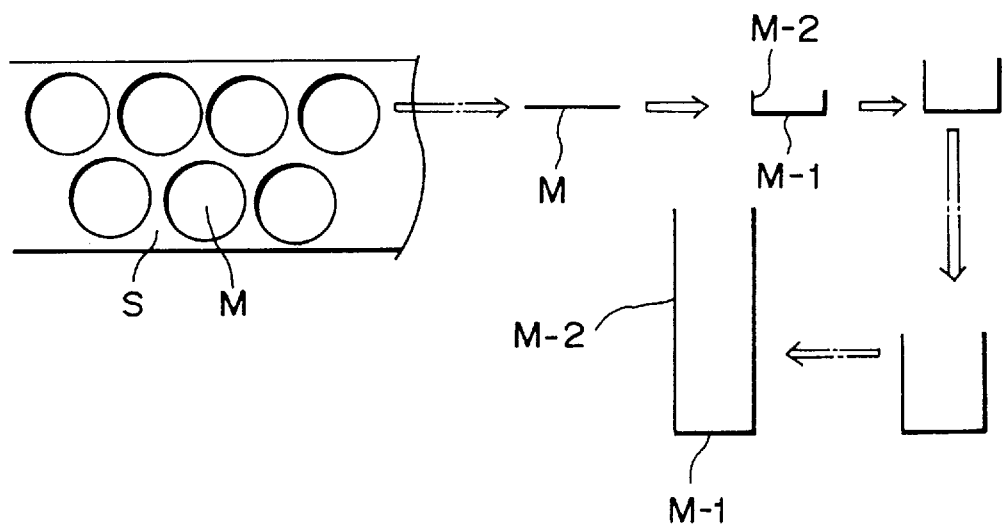
FIG. 1 is a view showing a method for manufacturing a battery can carried out by a conventional progressive pressing method.

Before the description of the present invention proceeds, it is to be noted that like parts are designated by like reference numerals throughout the accompanying drawings.

A battery can, a sheet to be processed into the battery can, and a method for manufacturing the sheet according to an embodiment of the present invention is described below with reference to the accompanied drawings.

Figure 14:
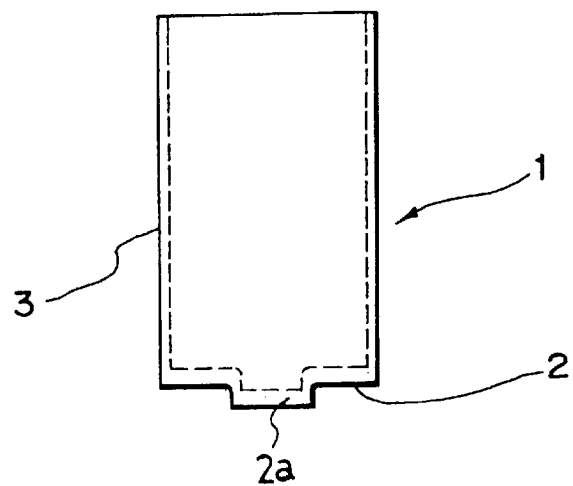
FIG. 14 is a front view showing a battery can according to an embodiment of the present invention.
Figure 15:
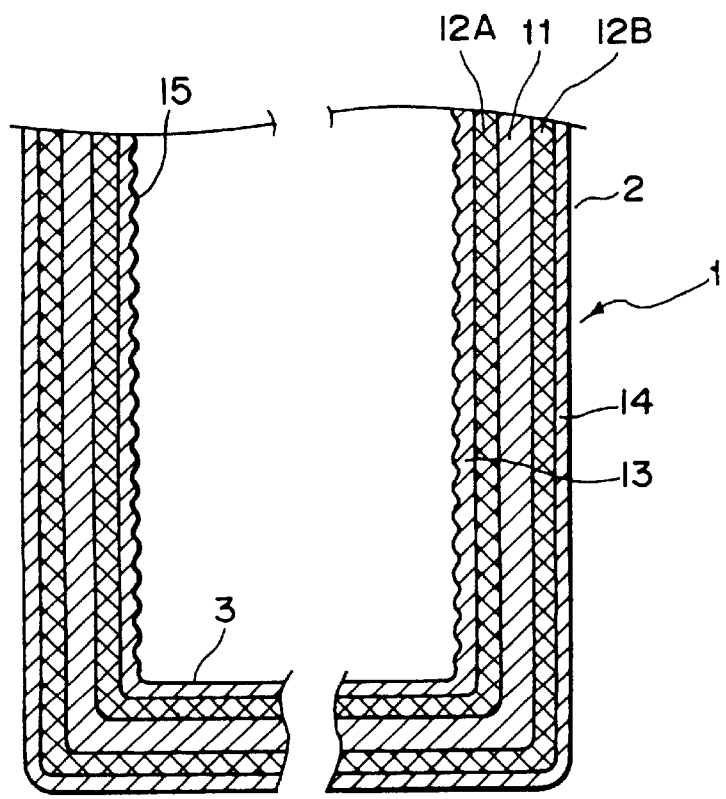
FIG. 15 is a partially enlarged sectional view showing the battery can shown in FIG. 14.

FIGS. 14 and 15 show a cylindrical battery can 1 according to the embodiment of the present invention. More specifically, the battery can 1 shown in FIGS. 14 and 15 has an opening at the upper end thereof and has a bottom wall 2 and a cylindrical wall 3. A positive contact 2a is formed on the surface of the bottom wall 2 of the battery can 1. After filler (not shown) is charged into a space surrounded with the bottom wall 2 and the cylindrical wall 3, a cover (not shown) having a negative contact formed on the upper end thereof is put on the upper end disposed of the wall 3. In this manner, the battery can 1 is manufactured.

Figure 16:
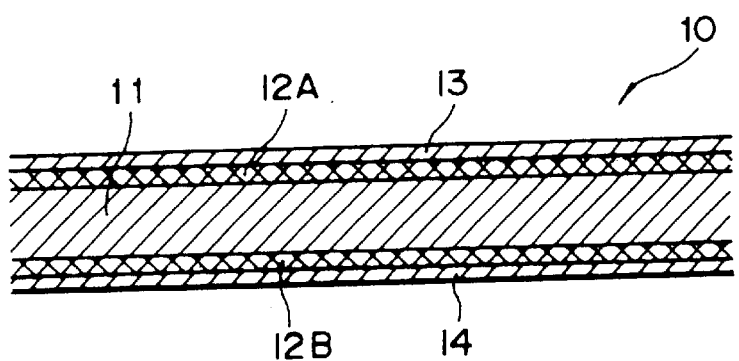
FIG. 16 is a sectional view showing a sheet, to be processed into the battery can, shown in FIG. 14.

FIG. 16 shows a sheet 10 made of a nickel-plated steel plate to be processed as the battery can 1 according to the embodiment. The sheet 10 comprises a very low carbon steel plate 11 and serving as the substrate of the sheet 10, Fe—Ni diffusion layers 12A and 12B disposed on both sides of the steel plate 11, Ni-plated layers 13 and 14 having a granular structure and disposed on the outer side of each of the Fe—Ni diffusion layers 12A and 12B.

Figure 22:
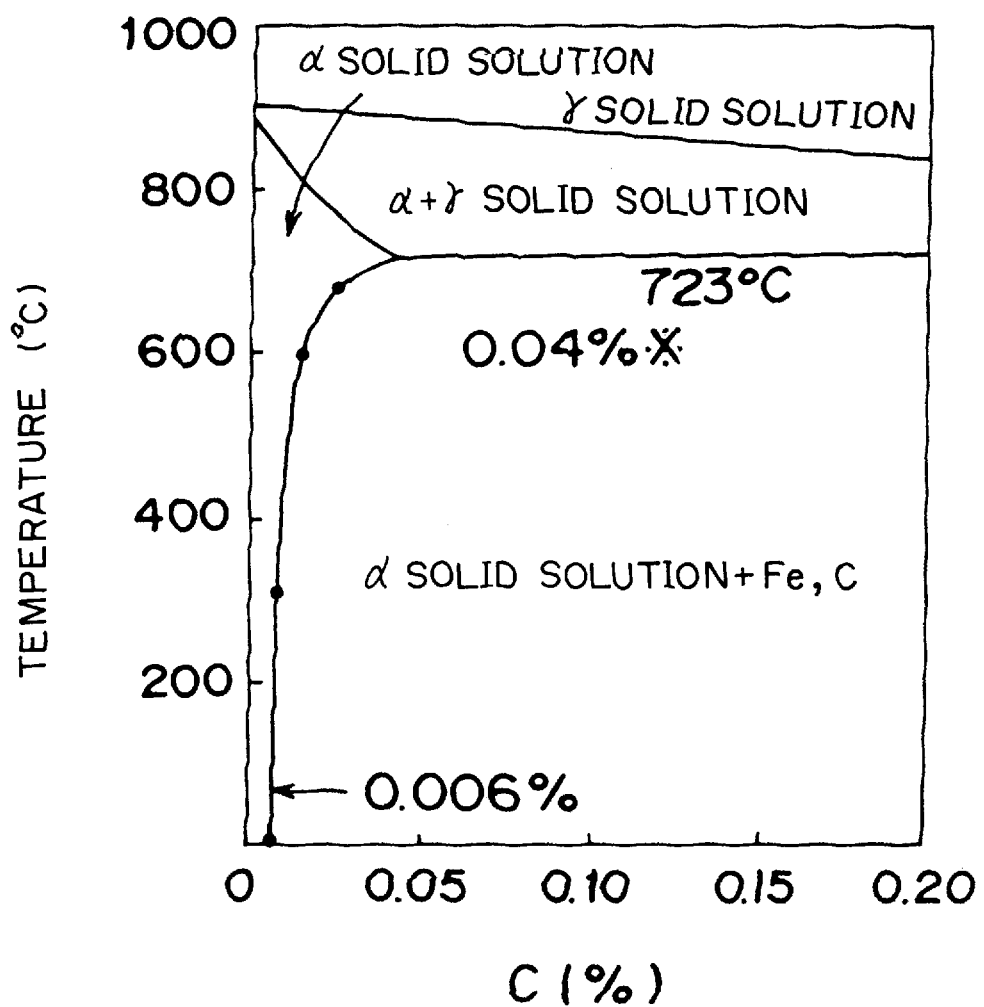
FIG. 22 is a diagram showing the property of iron.

The sheet 10 is formed molded into the battery can 1 shown in FIGS. 14 and 15 by drawing and ironing processing shown in FIG. 22.

The components of the steel plate 11 are as shown in Table 1. The steel plate 11 contains 0.002–0.003 wt % of carbon. Compared with low carbon steel (0.04–0.05 wt %) conventionally used as a material of a battery can, the steel plate 11 contains a much smaller amount of carbon. Preferably, the steel plate 11 contains carbon at less than 0.009 wt %.

TABLE 1

| component | content (wt %) |
|---|---|
| C | 0.002–0.003 |
| Mn | 0.14 |
| Si | 0.02 |
| P | 0.016 |
| S | 0.012 |
| H | 0.065 |
| Fe | remainder |

Figure 17:
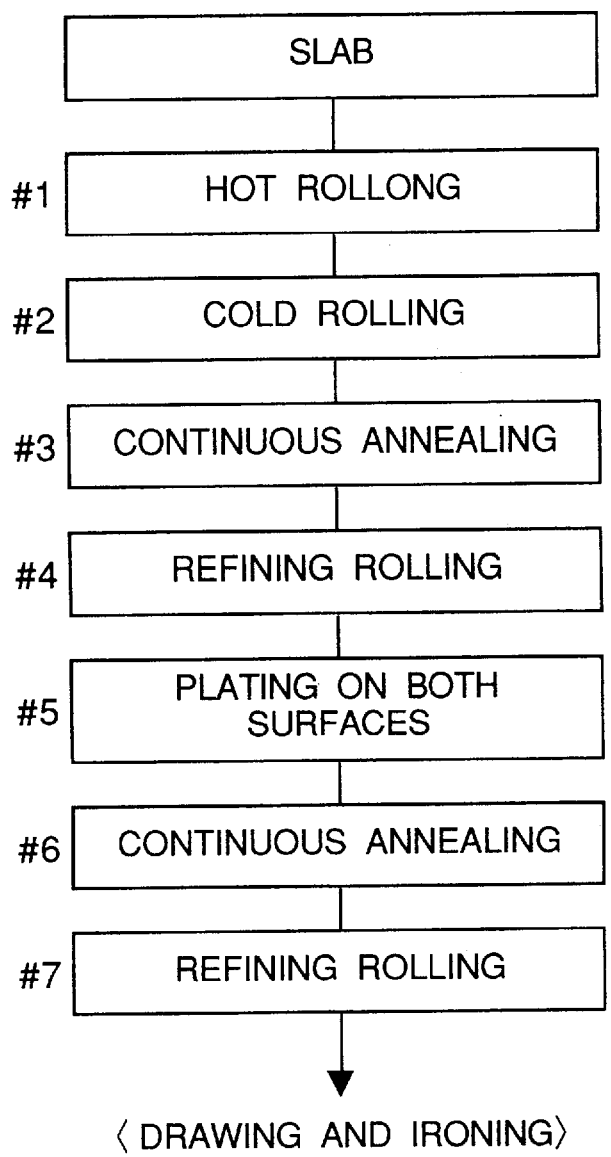
FIG. 17 is a flowchart showing a method of manufacturing the sheet, to be processed into the battery can, shown in FIG. 14.

The sheet 10 is manufactured in the order as shown in FIG. 17.

Figure 18A:
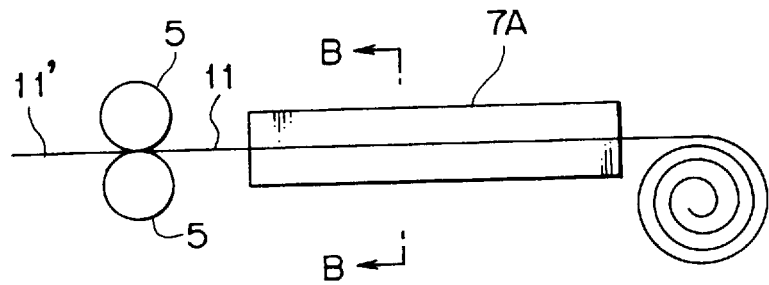
FIGS. 18A and 18B are schematic views each showing a hot rolling shown in the flowchart of FIG. 17.
Figure 18B:

Initially, at first step #1, slab comprising casted low carbon steel is hot-rolled. In the hot rolling, as shown in FIG. 18A, slab 11' having a thickness of 250 mm and temperature of 912° C. is hot-rolled at a rolling percentage of 98.68% by a pair of rollers 5 to coil the hot-rolled slab as the steel plate 11 having temperature of 699° C. On the downstream side of the rollers 5, a pair of heating means 7A and 7B comprising an electric heater is disposed on both sides of the hot-rolled plate so as to heat both sides of the steel plate 11 in the width direction thereof to 700° C.

Figure 19A:
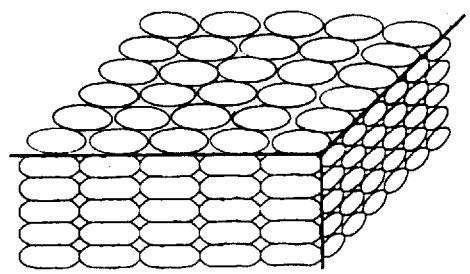
FIG. 19A is a schematic perspective view showing equi-axial grains.

The metallic structure of both sides and central portion of the steel plate 11 is allowed to be composed of equiaxial grains by annealing to be performed in a process as shown in FIG. 19A.

Figure 20:
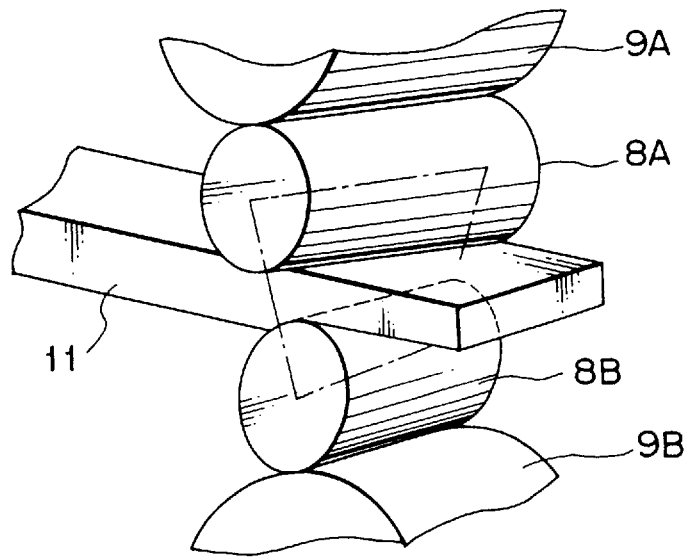
FIG. 20 is a schematic perspective view showing cold rolling.

At second step #2, the heat-rolled steel plate 11 is cold-rolled at room temperature as follows:

As shown in FIG. 20, there are provided work rolls 8A and 8B in contact with the steel plate 11 and back-up rolls 9A and 9B in contact with each of the work rolls 8A and 8B and pressing each of the work rolls 8A and 8B in the thickness direction of the steel plate 11. The steel plate 11 is cold-rolled at a desired rolling percentage, which will be described later.

In the cold rolling, the axes of the work rolls 8A and 8B form a predetermined angle so as to make the thickness of the steel plate 11 uniform in the width direction thereof.

The work rolls 8A and 8B prevent the thickness of the cold-rolled steel plate 11 from being reduced on both sides thereof in the width direction thereof. The work rolls 8A and 8B allow the thickness of the steel plate 11 in the center portion in the width direction thereof almost to be equal to the thickness thereof on both sides in the width direction thereof.

Experiments conducted by the present inventors indicates that when the axes of the work rolls 8A and 8B do not make the predetermined angle, a thickness reduction percentage of the steel plate 11 on both sides in the width direction thereof was approximately 4%, whereas when the axes of the work rolls 8A and 8B make the predetermined angle, thickness reduction percentage on both sides in the width direction thereof was as small as approximately 0.5%.

The present inventors made experiments, thus finding that rolling percentage in cold rolling was closely related to in-plane anisotropy Δr of the steel plate 11.

Figure 21:
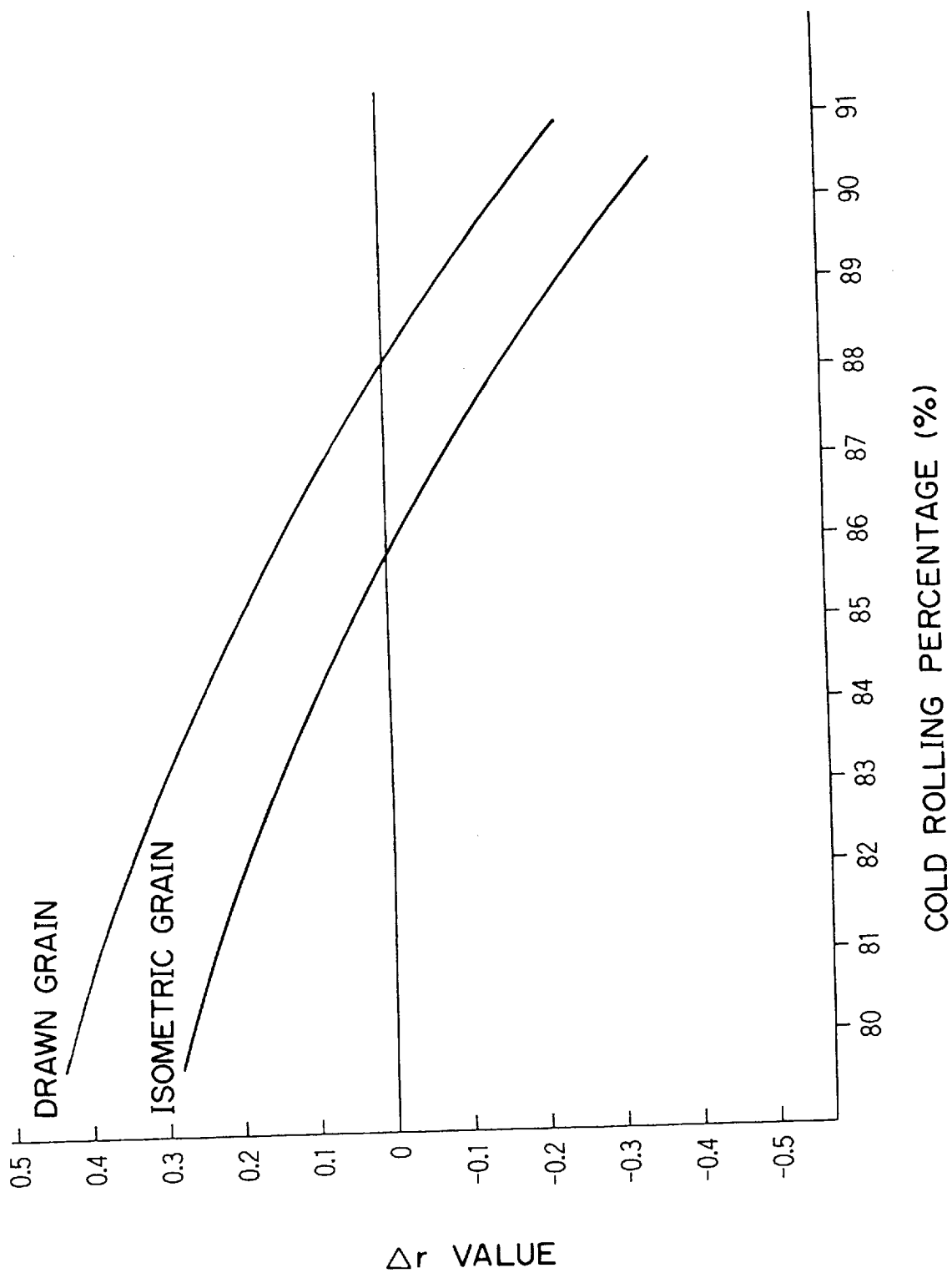
FIG. 21 is a diagram showing the relationship between cold rolling percentage and in-plane deviation Δr.

According to the experiments, the relationship between cold rolling percentage and in-plane anisotropy Δr is as shown in FIG. 21.

The experimental result indicates that the absolute value of the in-plane anisotropy Δr is less than 0.15 in order to prevent the formation of earring.

As indicated in FIG. 21, a cold rolling percentage to allow the absolute value of in-plane anisotropy Δr to be less than 0.15 is 83–88%.

In this embodiment, both sides of the steel plate 11 is heated in hot rolling to obtain equiaxial grains in the width direction thereof as described previously. Therefore, the cold rolling percentage is set to 83–88.

As described above, the cold rolling at step #2 allows the formation of the cold-rolled steel plate 11 which has a uniform thickness in the width direction thereof. In addition, the cold-rolled steel plate has Lankford value r at more than 1.2 lengthwise, widthwise, and obliquely and thus is ductile, and has in-plane anisotropy Δr, which is the difference among the Lankford values r, at less than ±0.15.

Figure 19B:
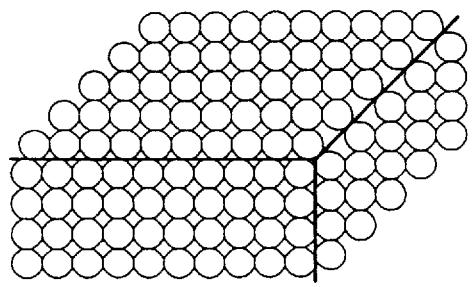
FIG. 19B is a schematic perspective view showing drawn grains.

In the case of drawn grains shown in FIG. 19B, cold rolling percentage to allow the absolute value of in-plane anisotropy Δr to be less than 0.15 is 86–89 as shown in FIG. 21.

If both sides of the steel plate 11 in the width direction thereof are not heated by the heating means 7A and 7B in the heat rolling to be performed at step #1, both sides of the steel plate 11 are rapidly cooled in coiling the steel plate 11. As a result, aluminum nitride is not precipitated but solidifies. As a result, the metallic structure on both sides of the steel plate 11 is composed of drawn grains while the metallic structure of the center portion thereof is composed of equiaxial grains. Therefore, in this case, the cold rolling percentage at step #2 is set to 84–90 so that the in-plane anisotropy Δr in both sides and central portion of the cold-rolled steel plate in the width direction thereof is less than ±0.15.

The in-plane anisotropy Δr can be made to be less than ±0.15 by setting cold rolling percentage to 80–90 depending on the kind of steel.

At step #3, continuous annealing is performed so that the metallic structure of the cold-rolled steel plate 11 is allowed to be composed of equiaxial grains as shown in FIG. 19A.

Referring to FIG. 22, in the continuous annealing, temperature is raised to 730° C. in a minute to heat the cold-rolled steel plate 11 rapidly and then, the temperature is maintained at 730° C. for 30 seconds. Then, the temperature is reduced in 20 seconds to cool the steel plate 11 to 400° C. rapidly. Thereafter, over-aging processing is performed at 400° C. for 150 seconds, and then, the temperature is reduced to 100° C. in 15 seconds to cool the steel plate 11. Then, the steel plate 11 is put out from an oven. It takes as short as approximately five minutes to accomplish the entire continuous annealing operation.

As a result, the metallic structure of the steel plate 11 is recrystallized and assumes a strain-free state. Because the continuous annealing is performed with the steel plate 11 being transported, heat is uniformly distributed to the steel plate 11 and it is unnecessary to form a film on the steel plate 11. In this embodiment, the steel plate 11 is rapidly heated to 730° C., but may be heated at a temperature in the range from 600° C. to 900° C.

Figure 10A:
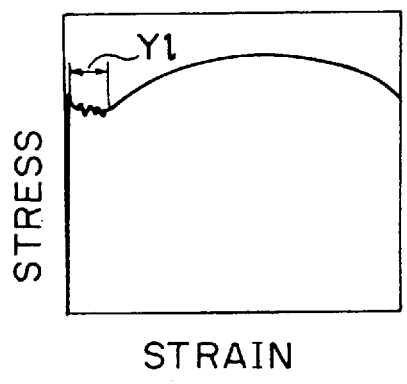
FIG. 10A is a diagram showing the relationship between stress and strain in non-annealed steel plate.
Figure 10B:
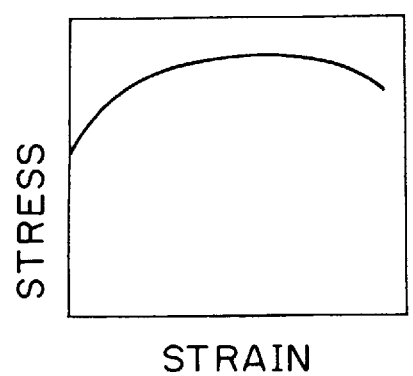
FIG. 10B is a diagram showing the relationship between stress and strain in a steel plate observed after continuous annealing and refining rolling are performed.
Figure 10C:
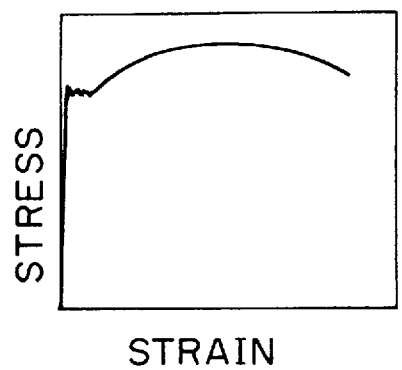
FIG. 10C is a diagram showing the relationship between stress and strain in a steel plate which has aged in strain.

At step #4, refining rolling is performed at a pressure-reducing percentage of 1.5. The relationship between the stress of the plate and strain thereof at the termination point of the refining rolling is as shown in FIG. 10B and the yield point elongation does not occur.

In this embodiment, the steel plate 11 contains as small as 0.002–0.003 wt % of carbon. Therefore, the steel plate 11 does not age. The relationship between the stress and strain of the plate as shown in FIG. 10B is maintained, and the yield point elongation does not occur again in the steel plate 11. This is because when the steel plate 11 contains less than 0.009 wt % of carbon, cementite is not present at the room temperature and carbon atoms are present in a solid solution of iron as shown in FIG. 22. The present inventors found in experiments that very low carbon steel does not age if the steel plate 11 contains less than 0.009 wt % of carbon.

At step #5, the upper and lower surfaces of the steel plate 11 is soft nickel-electroplated.

More specifically, one surface of the steel plate 11 corresponding to the outer surface of the cylindrical wall of the battery can is soft nickel-plated in a thickness of 2 μm–5 μm, whereas the other surface of the steel plate 11 corresponding to the inner surface of the cylindrical wall of the battery can is soft nickel-plated in a thickness of 0.5 μm–5 μm.

Instead of being soft nickel-plated, the inner surface of the steel plate 11 may be hard nickel-plated.

Figure 23A:
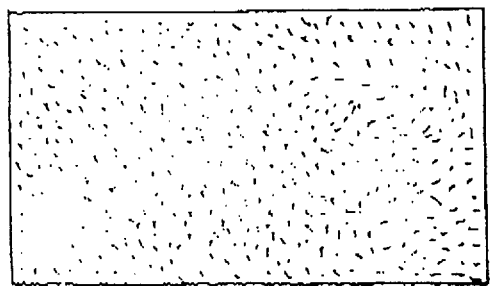
FIG. 23A is a schematic sectional view showing a acicular structure of a nickel-plated layer observed before annealing is performed.
Figure 23B:
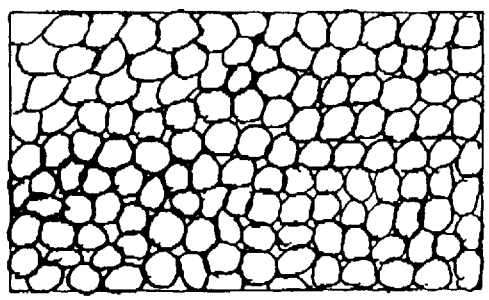
FIG. 23B is a schematic sectional view showing a granular structure of a nickel-plated layer observed after annealing is performed.

At step #6, continuous annealing is performed to form the Fe—Ni diffusion layers 12A and 12B between the steel plate 11 and each of the nickel-plated layers and change the entire metallic structure of the nickel-plated layer from acicular metallic structure shown in FIG. 23A to granular metallic structure, abundant in ductility, shown in FIG. 23B.

The continuous annealing is carried out at 600° C.–750° C. for 0.5–2 minutes depending on the kind of steel contained in the steel plate 11. In the continuous annealing, temperature is set to be low and annealing time period is set to be short when the nickel-plated layer is thin, whereas temperature is set to be high and annealing time period is set to be long when the nickel-plated layer is thick.

At step #7, refining rolling is performed at a pressure-reducing percentage of 0.5–2.0% to improve the metallic structure of the nickel-plated layer.

Owing to the change the structure of the nickel-plated layer from the acicular structure to the granular structure, ductility becomes preferable and thus cracks are not likely to occur in a portion, corresponding to the boundary between the bottom wall and cylindrical wall of the battery can, of the sheet 10 in forming it into the battery can and moreover, the corrosion-resistant property of the nickel-plated layer can be improved.

The granular metallic structure of the steel plate 11 allows the Lankford value (r) in lengthwise direction (rolling direction) X, widthwise direction Y, and oblique direction Z of the rolled plate to be more than 1.2 in average and the in-plane anisotropy Δr found as the difference among the Lankford values r to be less than ±0.15.

When the continuous annealing is performed at step #6 at a high temperature for a long time, the metallic structure of the steel plate 11 grows rapidly, i.e., the metallic structure in the surface thereof becomes composed of large grains (mix grain). As a result, there occurs a difference in the metallic structure between the inner portion of the steel plate 11 and the surface thereof.

Therefore, in the continuous annealing, the acicular metallic structure is changed to the granular metallic structure in the nickel-plated layer. As described above, in the continuous annealing, heating temperature is set to 600° C.–900° C. and heating time period is set to as short as 0.5–2 minutes according to the thickness of the nickel-plated layer in the range from 2 μm to 5 μm so that the metallic structure of Fe of the steel plate 11 does not grow into large grains.

The continuous annealing performed in the above-described range of heating temperature and time period changes the acicular metallic structure to the granular metallic structure in the nickel-plated layer. That is, the diameters of grains of the nickel-plated layer become 1 μm μ5 μm by performing the continuous annealing.

The grain size of crystal grains of the granular metallic structure of the nickel-plated layer becomes small, namely, grain size: No.9–No.10 provided in JIS-G-0552 both in the upper surface side and inner portion of the steel plate 11. That is, the diameters of grains are set to 10 μm–15 μm.

The sheet 10 to be formed into the battery can 1 is manufactured in steps 1 through 7.

Figure 4:
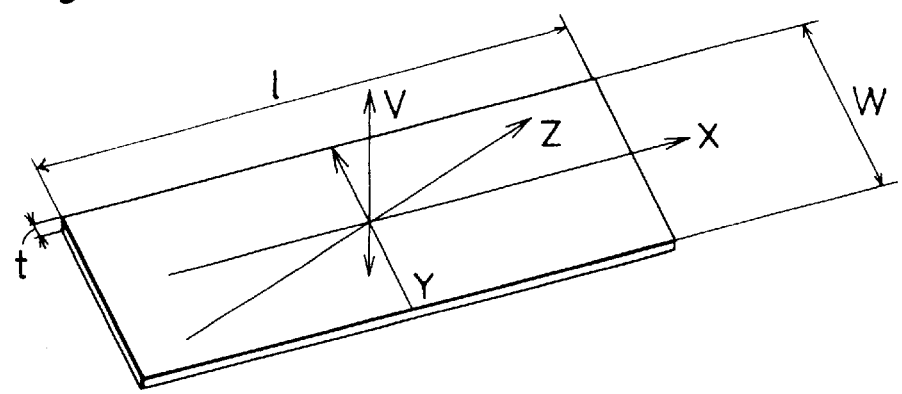
FIG. 4 is a schematic view for describing the elongation of a sheet to be processed into a battery can.
Figure 5:
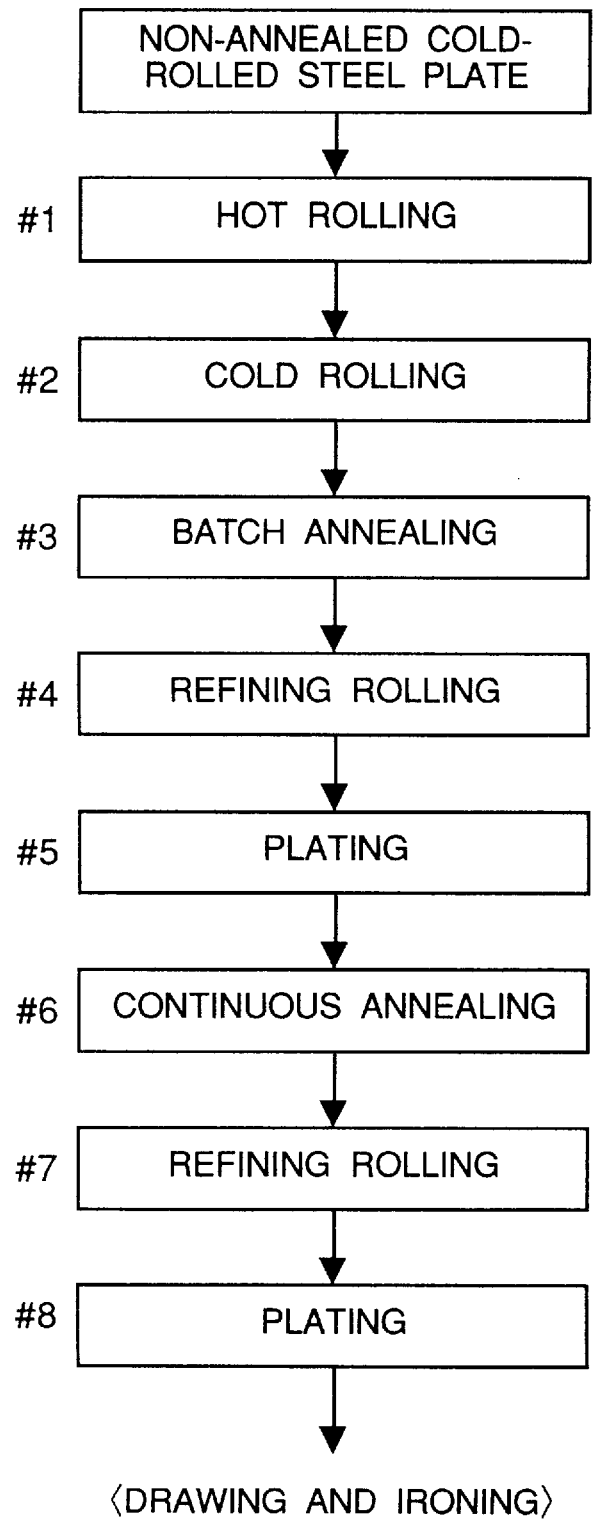
FIG. 5 is a flowchart showing a conventional method for manufacturing a sheet to be processed into a battery can.
Figure 6:
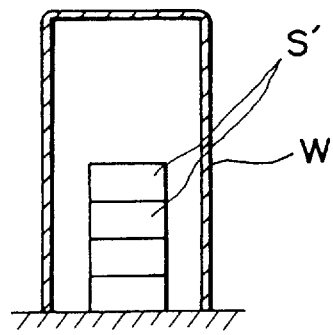
FIG. 6 is a schematic view showing batch annealing.
Figure 7:
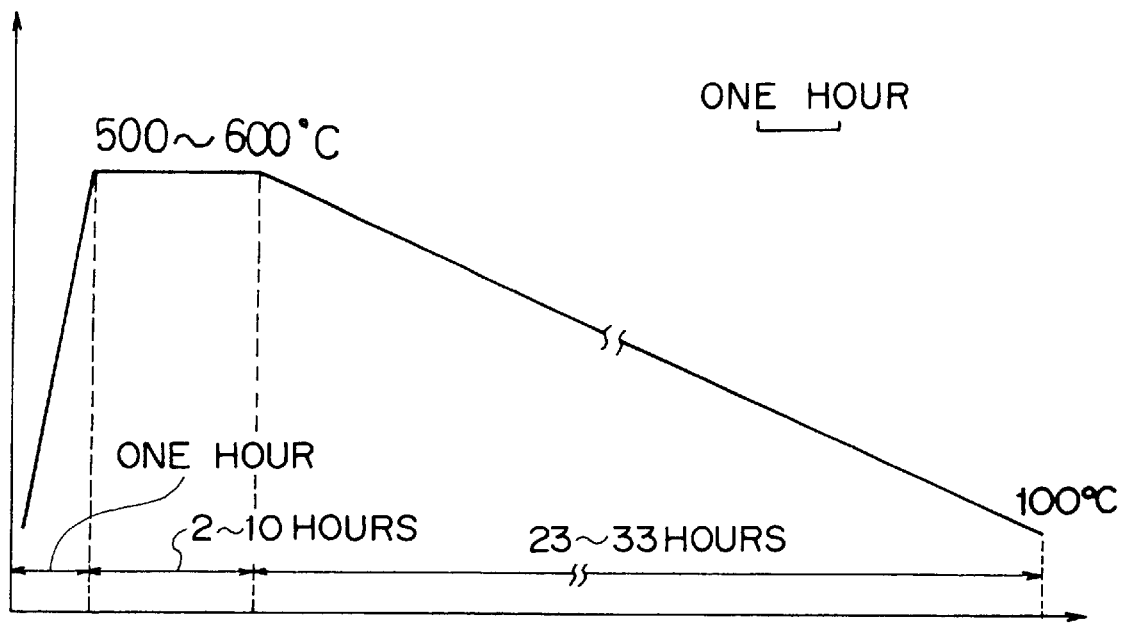
FIG. 7 is a diagram showing temperature setting in batch annealing.
Figure 8:
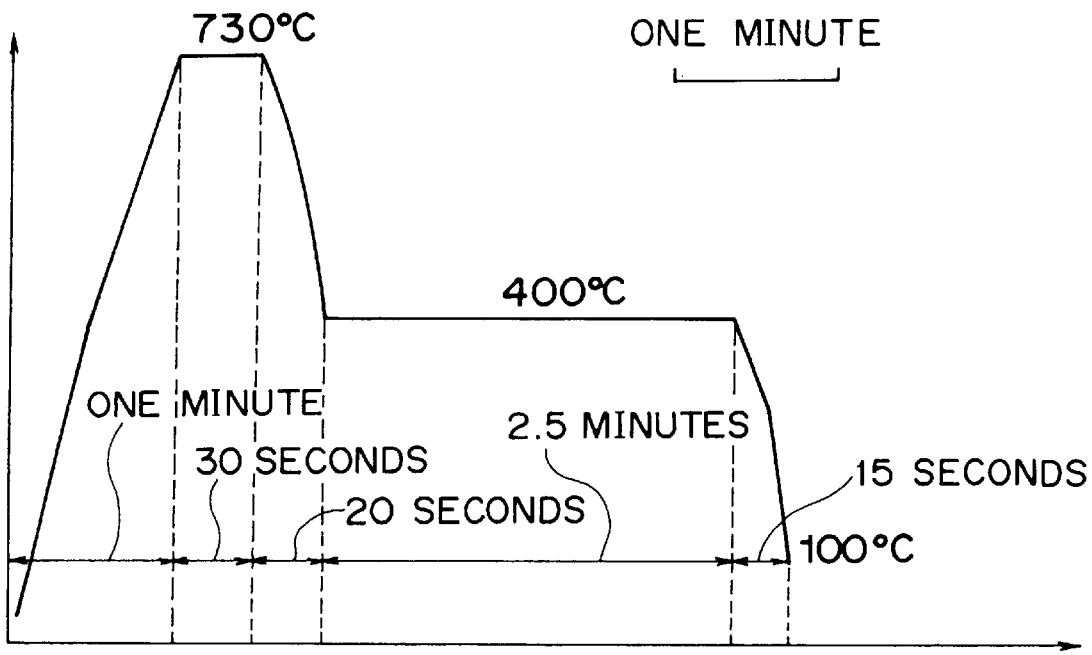
FIG. 8 is a diagram showing temperature setting in continuous annealing.
Figure 9:
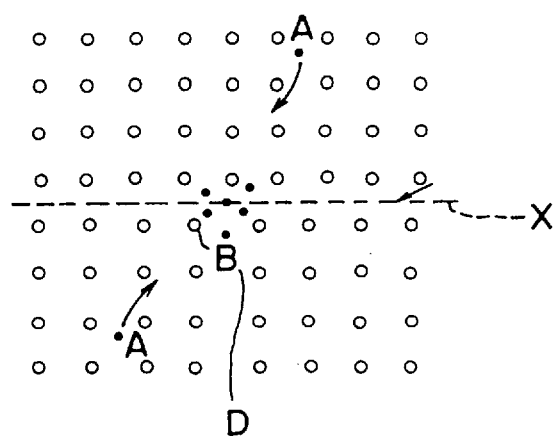
FIG. 9 is a schematic view showing the concentration of carbon atoms to a dislocation portion.
Figure 11:
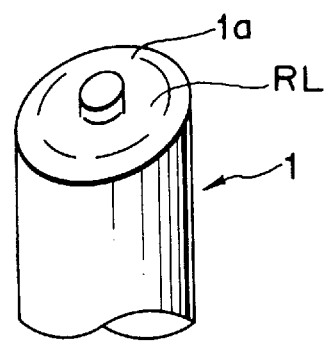
FIG. 11 is a partial perspective showing a phenomenon which occurs on a conventional battery can.

In processing the sheet 10 into the battery can 1 by means of drawing and ironing, it is important that the elongation coefficient of the sheet 10 is almost uniform or same in the lengthwise direction L, the widthwise direction W, and the oblique direction Z thereof as shown in FIG. 4 and that no earring is generated at the upper end of the cylindrical wall of the battery can.

That is, as described above, the sheet 10 comprising nickel-plated plate is processed as follows: at step #2, the steel plate 11 is rolled at a cold rolling percentage of 80–90% depending on the kind of steel. In the continuous annealing at step #6, the diffusion layers 12A and 12B are formed, and the metallic structure of the nickel-plated layers 13 and 14 are changed to the granular structure. Further, the grain size is small and approximately almost constant in the upper portion of the steel plate 11 and the inner portion thereof. Accordingly, the elongation coefficient of the sheet 10 in the lengthwise direction X, the widthwise direction Y, and the oblique direction Z thereof can be allowed to be more than 1.2 in average. That is, each Lankford value r of the sheet 10 which is a width deformation degree in X-direction/a thickness deformation degree in X-direction, a width deformation degree in Y-direction/a thickness deformation degree in Y-direction, a width deformation degree in Z-direction/a thickness deformation degree in Z-direction can be allowed to be more than 1.2 in average. In addition, the in-plane anisotropy Δr found as the difference among the rank hoard values (r) is allowed to be less than ±0.15.

Because the in-plane anisotropy Δr is small, earring can be prevented from being formed at the upper end of the cylindrical wall of the battery can can in drawing and ironing processing, and thus the battery can can be preferably drawn.

As described above, because the generation of earring can be prevented in drawing processing, the sheet 10 can be processed into the battery can at a high yield and in a small the number of manufacturing processes. Thus, the battery can can be manufactured at a low cost.

When the sheet 10 is drawn and ironed into battery can, the thickness of the cylindrical wall 3 of the battery can can be reduced to as small as approximately 0.1 mm.

Therefore, the volume of the space in the battery can can be increased, thus allowing a great quantity of filler. Hence, the battery can has a greater electric power.

The sheet 10 has no above-mentioned age and can be maintained without giving rise to yield point elongation because the steel plate 11 contains a very low amount of carbon. Stretcher strain is not generated on the battery can processed from the sheet 10 by drawing and ironing processing. Thus, the battery can looks fine.

In addition, because the continuous annealing is performed at steps #3 and #6, the sheet 10 can be manufactured in a short period of time and hence at low cost.

The nickel-plated layers 13 and 14 are superior in ductility because the nickel-plated layers 13 and 14 have the granular structure. As indicated by experimental data described below, the nickel-plated layers 13 and 14 are not likely to be cracked in a portion to be curved when they are curved in processing the sheet 10 into the battery can and thus, corrosion-resistant.

Experiment 1

How the metallic structure and elongation of the electroplated nickel-plated layers 13 and 14 are affected by annealing was observed.

It is difficult to observe and measure the metallic structure and mechanical characteristic of only the nickel-plated layer of the annealed nickel-plated cold-rolled steel plate 11. Therefore, instead, a nickel foil corresponding to the nickel-plated layer was annealed to observe the metallic structure and mechanical characteristic of the nickel foil.

That is, the nickel foil (electro-deposition) of 49 μm–54 μm (250 mm in length, 250 mm in width, and 50 mm in thickness) was put in an oven of 300 mm in length, 300 mm in width, and 250 mm in thickness to anneal it in gas atmosphere in which hydrogen and nitrogen were contained at 75% and 25%, respectively. Heating temperature was 650° C. and heating time period was one minute.

The experimental result is indicated in Table 2 shown below. As a result of the annealing, tensile force (T.S) became low, elongation coefficient (EL) became great, and metallic structure became granular structure (G.S).

TABLE 2

|  | T.S (kgf/mm) | EL (%) | G.S |
|---|---|---|---|
| Before annealing | 55.6 | 7 | Acicular metallic structure (13–14 μm) |
| After annealing | 30.9 | 14 | Granular metallic structure (1–5 μm) |

Experiment 2

In accordance with JIS provided in JIS-Z-2371, salt spray test was conducted on sheets, each comprising a nickel-plated plate according to the above-described embodiment, manufactured to measure the tensile force and elongation coefficient thereof and the metallic structure and corrosion-resistance of a curved surface of the nickel-plated layer.

The steel plate 11 was nickel-plated in a thickness of 3.5 μm on the upper and lower surfaces thereof. Then, the nickel-plated steel plate 11 was continuously annealed at 650° C. for a minute to manufacture a nickel-plated sheet.

The tensile force, elongation coefficient and surface hardness (HV) of the sheet comprising nickel-plated plate and the metallic structure of the nickel-plated layer were indicated in Table 3 shown below.

In accordance with JIS Standard, the sheet was bent by 90° (RI) to measure limitation time period by spraying salt water on the curved surface of the sheet.

TABLE 3

|  | T.S | EL | HV | GS | S.S.P | r | Δr |
|---|---|---|---|---|---|---|---|
| Before annealing | 76 | 3 | 200 | Acicular | 1 hour | 1.0 | +0.2 |
| After annealing | 33 | 39 | 105 | Granular | 8 hours | 1.3 | +0.0 |

In the above, HV: (load: 1 kg), S.S.P: salt spray time period, r: hankford value, and Δr: in-plane anisotropy As shown in Table 3, the limitation time period of the annealed nickel-plated layer (granular structure) was eight times as long as that of the nickel-plated layer not annealed. That is, it was observed that the former was highly corrosion-resistant.

A battery can according to a second embodiment of the present invention is described below with reference to FIG.

Figure 24:
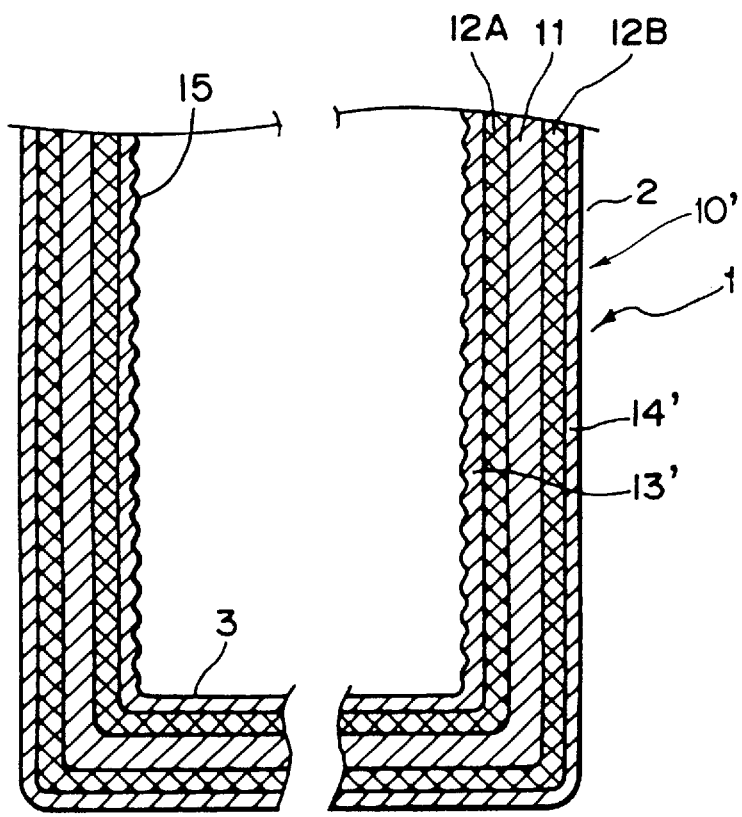
FIG. 24 is an enlarged sectional view showing principal portions of a battery can according to another embodiment of the present invention.

24 in particular. FIG. 24 shows the battery can comprising Fe—Ni diffusion layers 12A and 12B, a hard nickel-plated layer 13' adjacent to the diffusion layer 12A, and a bright nickel-plated layer 14' adjacent to the diffusion layer 12B. In drawing and ironing processing, the hard nickel-plated layer 13' constitutes the inner surface of the cylindrical wall of the battery can.

Figure 25:
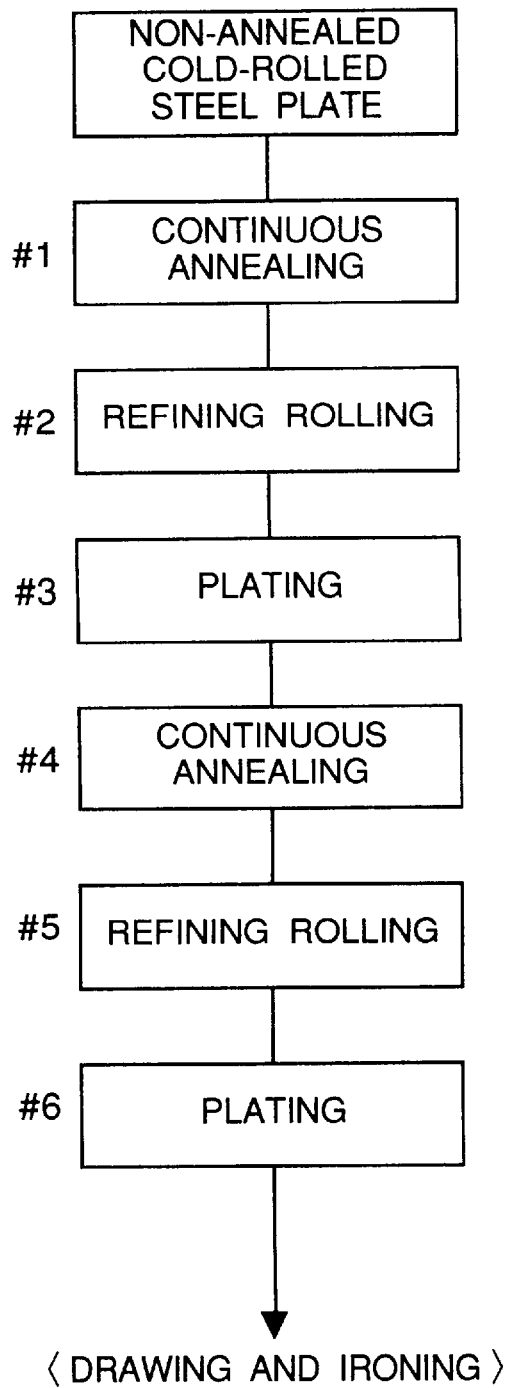
FIG. 25 is a flowchart showing another method for manufacturing a sheet, to be processed into a battery can, according to the present invention.

A sheet 10, to be processed into the battery can, according to the second embodiment is manufactured in the order shown in FIG. 25. The sheet 10 comprises a very low carbon steel plate 11 containing carbon at less than 0.009% wt %. Similarly to the first embodiment, slab comprising casted low carbon steel is hot-rolled. Then, the hot-rolled steel plate 11 is cold-rolled at cold rolling percentage of 80–90 depending on the kind of steel.

At first step #1, the cold-rolled steel plate 11 is continuously annealed in gas atmosphere similarly to step #3 of the first embodiment.

At second step #2, refining rolling is performed at a pressure-reducing percentage of 0.2–1.5.

At third step #3, the cold-rolled steel plate 11 is given a soft plating, i.e. nickel-plated in a thickness of 3–4 $\mu$m on the outer surface thereof and 0.5–1.0 $\mu$m on the inner surface thereof.

At fourth step #4, continuous annealing is carried out in gas atmosphere at 680° C.–750° C. again for a minute. In the continuous annealing, the Fe—Ni diffusion layers 12A and 12B are formed in a thickness of 2.0–3.0 $\mu$m between the inner surface of the steel plate 11 and the nickel-plated layer 13' and between the outer surface of the steel plate 11 and the nickel-plated layer 14', respectively.

At fifth step #5, refining rolling is performed at a pressure-reducing percentage of 0.5–1.5.

At sixth step #6, the steel plate 11 is bright nickel-plated again in a thickness of 0.5–1.0 $\mu$m on the outer surface thereof and hard nickel-plated in a thickness of 0.5–2.5 $\mu$m on the inner surface thereof.

The inner surface of the steel plate 11 is hard nickel-plated at sixth step #6 at a high current density of 100–150 A/dm$^2$ and at a flow speed as slow as less than $\frac{1}{10}$ (30 m/minute) of a normal flow speed (300 m/minute). In this manner, a hard nickel-plated layer is formed.

A hard nickel-plated layer can be formed by performing bright nickel plating by using a plating bath containing an organic substance and nickel mixed with each other. Needless to say, a very hard nickel-plated layer can be formed by performing bright nickel plating at a high current density and a slow flow speed.

A sheet 10' is manufactured at step #1 through step #6. That is, the sheet 10' comprises the cold-rolled steel plate 11 serving as the substrate thereof, the Fe—Ni diffusion layers 12A and 12B, the hard nickel-plated layer 13' to be disposed on the inner surface of the cylindrical wall of the battery can, and the bright nickel-plated layer 14' to be disposed on the outer surface of the cylindrical wall of the battery can.

Figure 2:
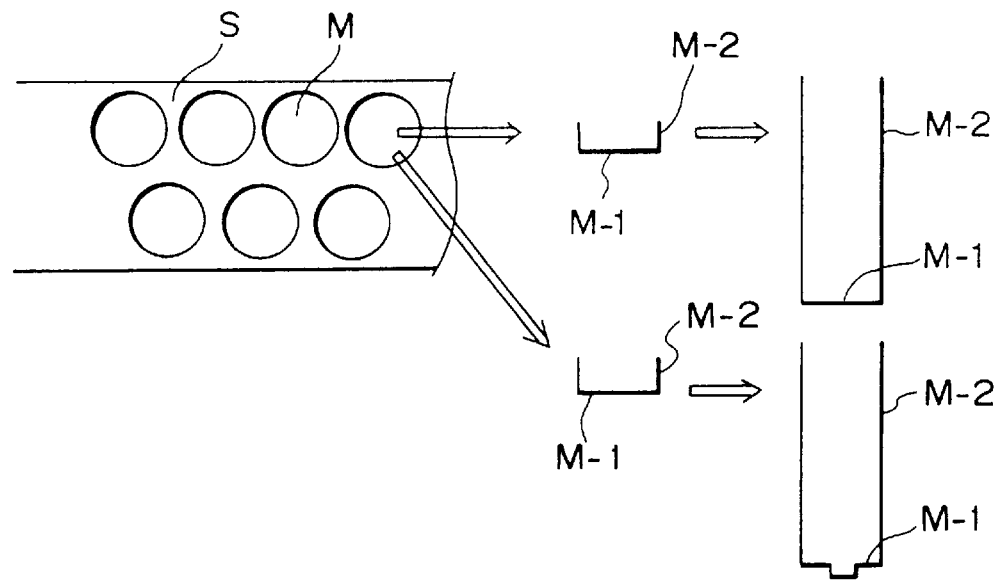
FIG. 2 is a view showing a method for manufacturing a battery can to be carried out by drawing and ironing processing according to an embodiment of the present invention.
Figure 3:
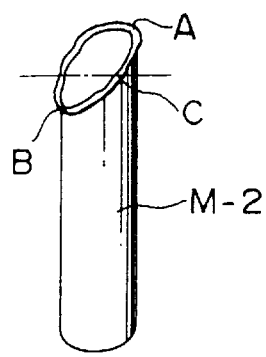
FIG. 3 is a schematic view showing earring which is a problem to be solved by the present invention.

The sheet 10' is drawn and ironed by the method shown in FIG. 2 to shape the battery can 1 into the configuration as shown in FIGS. 1 and 2.

In processing the sheet 10' into the battery can 1 by means of drawing and ironing, it is important that the elongation coefficient of the sheet 10' is approximately uniform in the lengthwise direction L, the widthwise direction W, and the oblique direction X thereof as shown in FIG. 4 and that no earring is generated at the upper end of the cylindrical wall of the battery can 1. To this end, the cold-rolled plate has a Lankford value r at more than 1.2 lengthwise, widthwise, and obliquely, and in-plane anisotropy $\Delta r$, found as the difference among Lankford values r, at less than ±0.15. In order to obtain Lankford value r at more than 1.2, it is necessary to allow the metallic structure (grain size) of the cold-rolled plate to have a constant size (No. 9–10 provided in JIS Standard) in continuous processing.

In the process of manufacturing the nickel-plated plate, the steel plate 11 is annealed again only as short as for a minute at step #4. If the steel plate 11 is annealed at a high temperature, the metallic structure thereof grows rapidly and as a result, will be made of rough grains (mix grain) in the surface portion thereof. As a result, there will occur a difference in the metallic structure between the inner portion of the steel plate 11 and the upper surface thereof.

Accordingly, in the second continuous annealing, it is necessary to anneal the plated steel plate 11 at a temperature at which the metallic structure thereof does not change. Experiment result indicates that the metallic structure thereof does not change when continuous annealing is carried out at 680°–750° C. for a minute.

In the sheet 10' comprising the nickel-plated steel plate 11 manufactured in the above-described process, the metallic structure of the surface portion thereof is not different from that of the inner portion thereof. Therefore, the elongation coefficient of the sheet 10' is allowed to be almost uniform lengthwise, widthwise, and obliquely, respectively. Thus, earring can be prevented from being generated at the upper end of the cylindrical wall of the battery can in drawing the plate 10', and hence the sheet 10' can be favorably drawn.

In the second continuous annealing, the Fe—Ni diffusion layers 12A and 12B are formed between the cold-rolled steel plate 11 and the hard nickel-plated layer 13' as well as the bright nickel-plated layer 14' in a thickness of 2.0 $\mu$m–3.0 $\mu$m at 680° C.–750° C. for a minute.

At step #6, the hard nickel-plated layer 13' is formed in a thickness of 0.5–2.5 $\mu$m on the diffusion layer 12A. The hard nickel-plated layer 13' is disposed in the inner surface of the cylindrical wall of the battery can. Therefore, in drawing the sheet 10' to ½ of the original thickness, the diffusion layer 12A and the hard nickel-plated layer 13' shift from each other. Owing to the layer shift, the inner surface of the cylindrical wall 3 of the battery can 1 shown in FIGS. 15 and 24 is cracked randomly like wedges lengthwise, widthwise, and obliquely.

The cracks 15 roughens the inner surface of the cylindrical wall 3 of the cylindrical battery can 1 in such a condition that contact resistance of the inner surface to filler is reduced, thus improving the electrical performance of the battery can.

As described above, in drawing processing, the bright nickel-plated layer 14' is formed on the surface of the Fe—Ni diffusion layer 12B. The bright nickel-plated layer 14' is disposed on the outer surface of the cylindrical wall of the battery can 1. The amount of an organic substance mixed with bright nickel to be applied to the surface of the Fe—Ni diffusion layer 12B to form the bright nickel-plated layer 14' is less than the amount of an organic substance mixed with bright nickel to be applied to the surface of the Fe—Ni diffusion layer 12A to form the hard nickel-plated layer 13' thereon. Therefore, the hardness of the bright nickel-plated layer 14' is not great and the thickness thereof is as thin as 0.5–1.0 $\mu$m. Further, the Fe—Ni diffusion layer 12B disposed between the steel plate 11 and the bright nickel-plated layer 14' is as thin as 2.0–3.0 $\mu$m. Accordingly, cracks can be prevented from being generated at the corner (portion to be curved) of the battery can 1 when the sheet 10' is drawn, and thus the battery can 1 is corrosion-resistant.

In the drawing and ironing processing, the thickness of the sheet 10' can be reduced to approximately ½ of the original thickness thereof or less. Therefore, the outer surface of the cylindrical wall 3 of the battery can 1 has a small surface roughness and smooth like mirror surface. But the surface of the bottom wall 2 is not drawn, and thus the surface of the bottom wall 2 may not be bright. Consequently, the battery can 1 is defective in its appearance and hence low in commercial value.

Because the bright nickel-plated layer 14' is formed on the surface of the Fe—Ni diffusion layer 12B of the nickel-plated plate 10' at step #6, the surface of the bottom wall 2 of the battery can 1 can be allowed to be smooth like a mirror.

In addition to the above method of nickel-plating the Fe—Ni diffusion layers, the surface of the Fe-Ni diffusion layers can be allowed to be bright by adjusting pressure-reducing percentage to an appropriate value in refining rolling.

Figure 26:
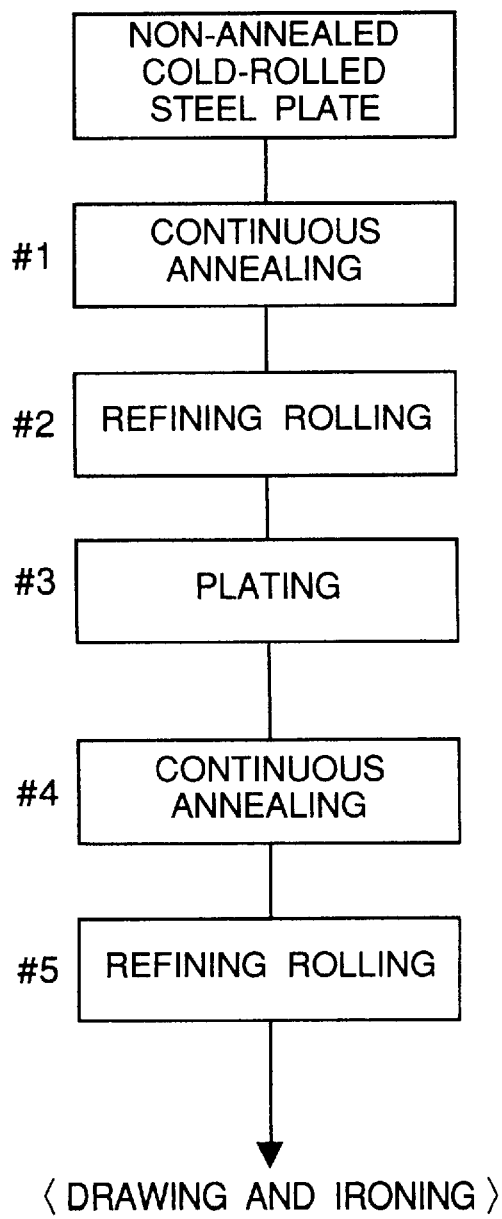
FIG. 26 is a flowchart showing a method for manufacturing a sheet, to be processed into a battery can, according to still another embodiment of the present invention.

FIG. 26 is a flowchart showing a third method, for manufacturing a sheet to be processed into a battery can 1, according to the present invention.

At first step #1, continuous annealing is performed on a cold-rolled steel plate 11 at 630° C. for 20 hours in gas atmosphere similarly to the second embodiment.

At second step #2, refining rolling is performed at a pressure-reducing percentage of 0.5.

At third step #3, the cold-rolled steel plate 11 is soft nickel-plated in a thickness of 3 $\mu$m on a surface which is disposed in the outer surface of the cylindrical wall of the battery can 1 when the sheet comprising the steel plate 11 is drawn, and then bright nickel-plated in a thickness of 1 $\mu$m, then soft nickel-plated in a thickness of 0.5 $\mu$m on the other surface which is disposed on the inner surface of the cylindrical wall of the battery can 1. Then, the other surface of the cold-rolled steel plate 11 is hard nickel-plated (bright nickel-plated) in a thickness of 2.0 $\mu$m.

At fourth step #4, continuous annealing is carried out in gas atmosphere at 730° C. again for a minute. In the continuous annealing, a Fe—Ni diffusion layer is formed between the inner surface of the steel plate 11 and one nickel-plated layer and between the outer surface of the steel plate 11 and the other nickel-plated layer. Both Fe—Ni diffusion layers have the same thickness.

At fifth step #5, refining rolling is performed at pressure-reducing percentage of 1.0.

Large size grains are not formed on the surface of the steel plate 11 in the first refining rolling at step #2 (pressure-reducing percentage: 0.5) and the second refining rolling (pressure-reducing percentage: 1.0) at step #5.

In this manner, the sheet comprising the nickel-plated plate is manufactured at step #1 through #5. The nickel-plated sheet is drawn and ironed to form the battery can.

In the drawing and ironing processing, wedge-shaped cracks are formed in a favorable state on a surface of the sheet corresponding to the inner surface of the cylindrical wall of the battery can. The bright (hard) nickel-plated layer formed in a thickness of 2.0 $\mu$m on the surface of the inner diffusion layer contains an organic substance. More specifically, bright nickel plating bath contains a greater amount of organic substance than usual. Therefore, the nickel-plated layer is hard and thus preferable cracks are generated.

The organic substance is baked and decomposed when the sheet is annealed at more than 730° C., for example, 780° C. for one minute in the continuous annealing to be performed at step #4 after the cold-rolled steel plate is plated at step #3. The organic substance is carbonized but not baked at 730° C. in one minute. Consequently, the organic substance remains as carbide, thus forming a hard nickel-plated layer. A layer shift occurs between the Fe—Ni diffusion layer having a thickness of 2.0 $\mu$m and the bright nickel-plated layer (hard nickel-plated layer) disposed thereon, thus generating the cracks.

The bright nickel-plated layer is formed on the surface of the sheet corresponding to the outer surface of the cylindrical wall of the battery can. The bright nickel-plated layer contains a normal amount of organic substance but does not have a high hardness. The thickness of the diffusion layer disposed between the outer surface of the steel plate and the outer bright nickel-plated layer is 2.0 $\mu$m. The outer bright nickel-plated layer is as thin as 1 $\mu$m. Consequently, cracks are not likely to be generated on the outer surface of the cylindrical wall of the battery can and hence the battery can is corrosion-resistant. Further, the steel plate is bright nickel-plated before the continuous annealing is performed at step #4. Accordingly, even though the organic substance is carbonized after the continuous annealing is carried out, the brightness is maintained and the outer bright nickel-plated layer maintains the brightness and the refining rolling to be performed at step #5 allows the outer bright nickel-plated layer to be brighter.

Even though the bright nickel-plated layer is not formed on the surface of the Fe—Ni diffusion layer, the outer surface of the cylindrical wall of the battery can can be allowed to have a mirror-like surface by setting pressure-reducing condition appropriately in the refining rolling.

Figure 27:
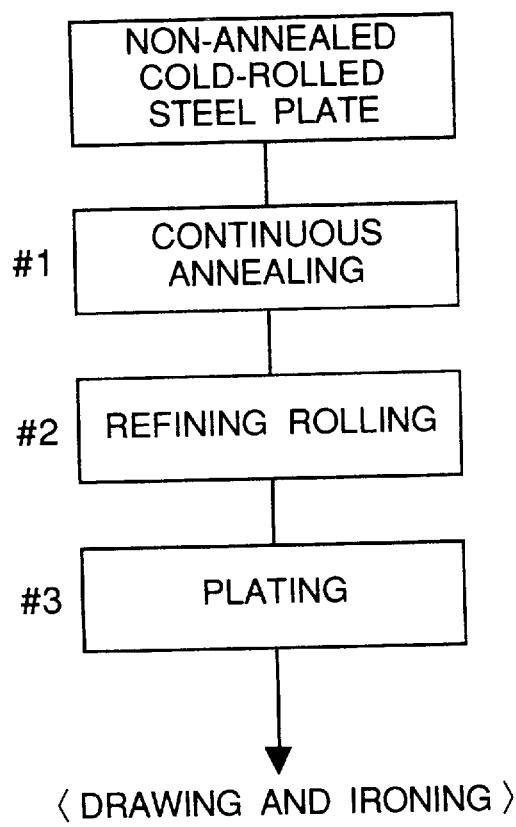
FIG. 27 is a flowchart showing a method for manufacturing a sheet, to be processed into a battery can, according to a further embodiment the present invention.

FIG. 27 is a flowchart showing a fourth method, for manufacturing a sheet to be processed into the battery can 1 according to the present invention.

In the fourth method, at step #1, continuous annealing is performed on a non-annealed cold-rolled plate in gas atmosphere.

At second step #2, refining rolling is performed at a pressure-reducing percentage of 1.3.

At third step #3, the cold-rolled plate is soft-nickel-plated in a thickness of 3.5 $\mu$m on a surface of the steel plate which is disposed on the outer surface of the cylindrical wall of the battery can, and then bright nickel-plated in a thickness of 1.5 $\mu$m, while the steel plate is soft nickel-plated in a thickness of 0.5 $\mu$m on the other surface which of the steel plate is disposed in the inner surface of the cylindrical wall of the battery can and then bright nickel-plated in a thickness of 2.0 $\mu$m.

In the fourth method, a sheet comprising the nickel-plated steel plate is manufactured at step #1 through #3. The sheet is drawn and ironed to form the battery can.

In the sheet manufactured by the fourth method, Fe—Ni diffusion layers are not formed between the cold-rolled plate and the nickel-plated layers. But wedge-shaped cracks are generated on the inner surface of the sheet due to a layer shift between the soft nickel-plated layer and the bright (hard) nickel-plated layer. The outer nickel-plated layer of the steel plate is as corrosion-resistant as an outer nickel-plated layer formed on a diffusion layer having a thickness of 2.0 $\mu$m. The sheet can be drawn favorably because no diffusion layers are formed on the steel plate.

According to the fourth method, manufacturing cost is high because it is necessary to deposit nickel on the outer surface of the steel plate in a thickness as great as 5 μm, whereas normally, the outer surface of the steel plate is nickel-plated in a thickness of 3 μm before the sheet comprising the steel plate is drawn.

It is possible to differentiate the thickness of the Fe—Ni diffusion layer to be formed on one surface of the cold-rolled steel plate from the thickness of the Fe—Ni diffusion layer to be formed on the other surface thereof.

That is, one surface of the cold-rolled steel plate corresponding to the inner surface of the cylindrical wall of the battery can and the other surface thereof corresponding to the outer surface of the cylindrical wall of the battery can are plated with nickel in a thickness of 0.5–1.0 μm and 0.1–0.2 μm, respectively and then, the batch annealing is performed. Then, one surface and the other surface of the steel plate are plated with soft nickel in a thickness of 0.5 μm and 3 μm, respectively. Thereafter, the continuous annealing is carried out.

In the continuous annealing, the diffusion layer is formed on one surface and the other surface of the cold-rolled steel plate in a thickness of 3.0–5.0 μm and 0.5–1.0 μm, respectively. In the continuous annealing, the diffusion layer can be formed on one surface and the other surface of the cold-rolled steel plate in a thickness of 2 μm and 2 μm.

As a result, the diffusion layer is formed on one surface of the cold-rolled steel plate and the other surface thereof in a thickness of 5.0 μm–7.0 μm and 0 μm–3.0 μm, respectively.

In this manner, the diffusion layers different from each other in thickness can be formed on both surfaces of the steel plate.

In the fourth method, the diffusion layer is formed in a thickness of as great as 5.0 μm–7.0 μm on one surface of the steel plate to be disposed on the inner surface of the battery can. Accordingly, cracks are formed on the inner surface of the cylindrical wall of the battery can in drawing the sheet and hence the inner surface of the cylindrical wall of the battery can has a large surface area. In addition, the diffusion layer is formed in a thickness as thin as 0 μm–3.0 μm on the other surface of the steel plate to be disposed on the outer surface of the cylindrical wall of the battery can. Accordingly, cracks are not likely to be formed on the other surface of the sheet and thus corrosion-resistant.

The electrical performance of the battery can can be further improved by forming the diffusion layers having a different thickness on both surfaces of the cold-rolled steel plate.

The following comparison nickel-plated steel plates were manufactured to compare the performance thereof and that of nickel-plated steel plate according to the present invention with each other.

Referring to FIG. 25 showing the process of manufacturing the sheet comprising the nickel-plated steel plate, one surface of the inner diffusion layer of a steel plate was not hard nickel-plated, but soft nickel-plated in a thickness of 2.0 μm at step #6 to form the comparison nickel-plated steel plate.

Wedge-shaped cracks were not formed but vertical cracks were generated on the comparison nickel-plated sheet in drawing and ironing it. The vertical cracks did not increase the area of the inner surface of the battery can as much as the wedge-shaped cracks. That is, the performance of the comparison nickel-plated steel plate was approximately 60% of that of the nickel-plated steel plate according to the present invention.

It is possible to form diffusion layers by batch annealing after nickel-plating the surface of a non-annealed cold-rolled steel plate corresponding to the outer surface of the cylindrical wall of the battery can and the surface corresponding to the inner surface of the cylindrical wall of the battery can in a thickness of 3.0 μm and 0.5 μm, respectively. In this case, it is necessary to anneal the steel plate at a low temperature for a long time so as to secure the mechanical strength thereof. In this case, a diffusion layer as thick as 5 μm–10 μm and 3–5 μm is formed on the surface corresponding to the outer and inner surfaces of the cylindrical wall of the battery can, respectively.

In case the diffusions layers are thick, cracks are likely to be formed on the outer surface of the cylindrical wall of the battery can in drawing and ironing the sheet comprising the nickel-plated steel plate. As a result, the battery can is much unfavorable than the battery can having thin diffusion layers in corrosion-resistant performance. Hence the sheet cannot be preferably drawn and thus earring is generated.

Figure 28:
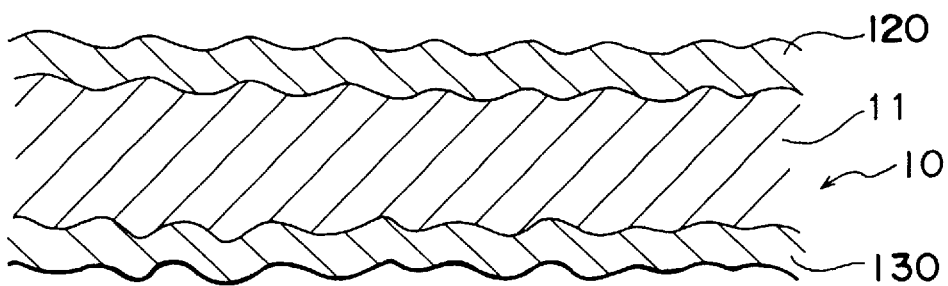
FIG. 28 is an enlarged sectional view showing a method for manufacturing a sheet, to be processed into a battery can, according to a still further embodiment of the present invention.
Figure 29:
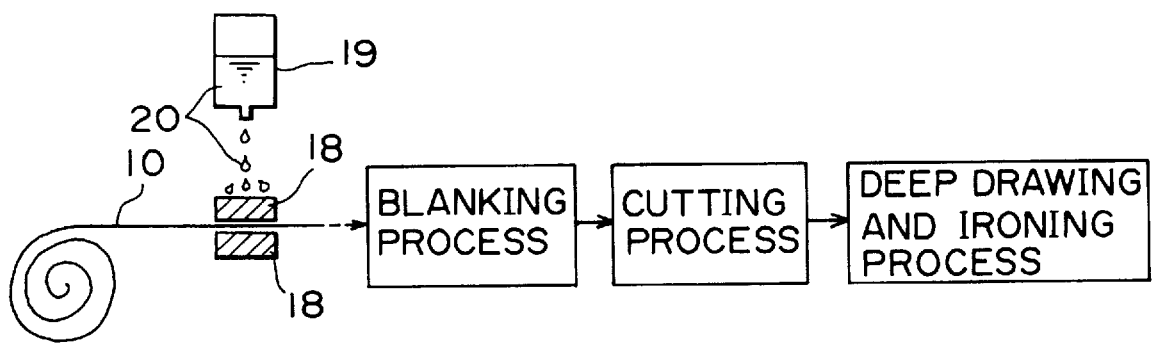
FIG. 29 is a schematic view showing process of applying lubricating oil to the sheet of FIG. 28.
Figure 30:
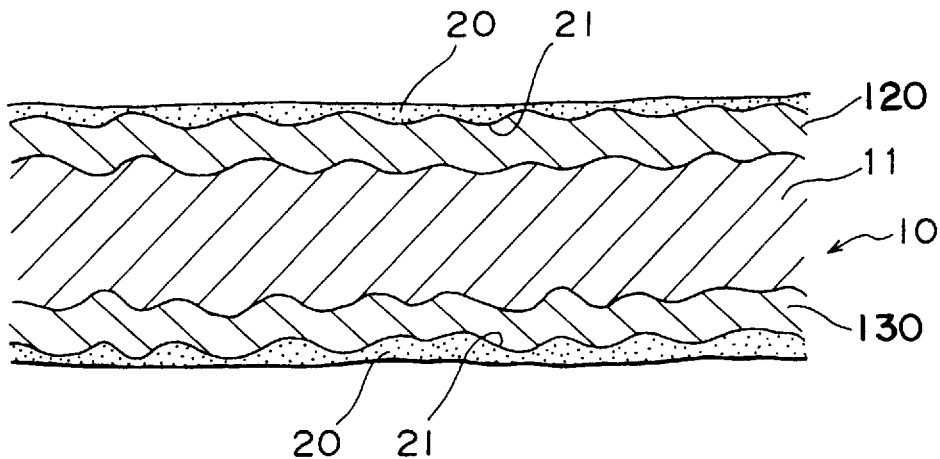
FIG. 30 is an enlarged sectional view showing the sheet of FIG. 29 to which lubricating oil has been applied.

FIGS. 28 through 30 show another embodiment of the present invention. FIG. 28 is an enlarged sectional view showing a sheet 10 comprising nickel-plated layers 120 and 130 formed on the upper and lower surface of a steel plate 11, respectively.

The steel plate 11 is formed by hot-rolling casted slab to a predetermined thickness by a hot-rolling roll, and by cold-rolling the hot-rolled steel plate 11 to a predetermined thickness by a cold-rolling roll. In the cold rolling, the upper and lower surface of the steel plate 11 are roughened.

That is, the surface of the cold-rolling roll (not shown) is polished with an abrasive material to allow the roll to have a surface roughness 0.5 μm–1.0 μm. Thus, when the steel plate 11 is cold-rolled, the surface roughness of the roll is transferred to the steel plate 11. As a result, the surface roughness of the upper and lower surfaces of the steel plate 11 becomes 0.5–1.2 μm.

The slab has a thickness of approximately 250 mm and a temperature of approximately 900° C. As a result of the hot rolling at 700° C, the thickness of the slab (steel plate 11) becomes 3.3 mm. As a result of the cold rolling at the room temperature, the thickness of the steel plate 11 becomes 0.406 mm.

The surface roughness of the steel plate 11 is made to be high at the upper and lower surfaces thereof in the cold rolling. Therefore, when the upper and lower surfaces of the steel plate 11 are covered with the nickel-plated layers 13 and 14 in a uniform thickness of 0.5–5 μm, both surfaces of the nickel-plated layer, namely, both surfaces of the sheet 10 to be processed into the battery can have a roughness of 0.5–5 μm.

The sheet 10 is coiled and fed to manufacturing processing in which as shown in FIG. 29, the sheet 10 is fed to blanking process, cupping process, and drawing and ironing process sequentially with the sheet 10 being rewound from a roll not shown.

In lubricating oil-applying process which is performed before blanking process is carried out, the sheet 10 fed out from the roll is brought into contact with a pair of felt materials 18 and 18 to which lubricating oil 20 is supplied from a lubricating oil reservoir 19. Therefore, the lubricating oil 20 is supplied to both surfaces of the sheet 10 when the sheet 10 is brought into contact with the felt materials 18 and 18. When lubricating oil of a low viscosity is used, the lubricating oil may be dripped to the sheet 10 forward of the felt materials 18 and 18.

As described above, the surface roughness Ra of both upper and lower surfaces of the sheet 10 is 0.5 μm–1.0 μm.

That is, as shown in FIG. 30, the upper and lower surfaces of the sheet 10 are convex and concave and thus the sheet 10 has a great surface area. Therefore, the lubricating oil 20 is supplied to both surfaces of the sheet 10 and stored in concaves 21.

A sufficient amount of lubricating oil 20 is supplied to both upper and lower surfaces of the sheet 10 and stored thereon. Thus, a sufficient amount of lubricating oil 20 is held on the sheet 10 in cupping and drawing and ironing processes.

Figure 12:
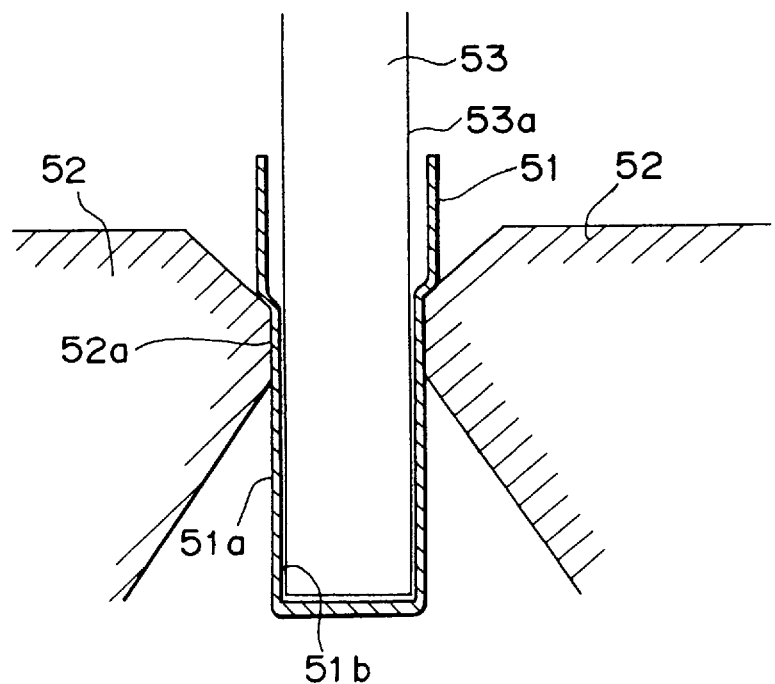
FIG. 12 is a sectional view showing a processing state in a drawing and ironing die.
Figure 13:
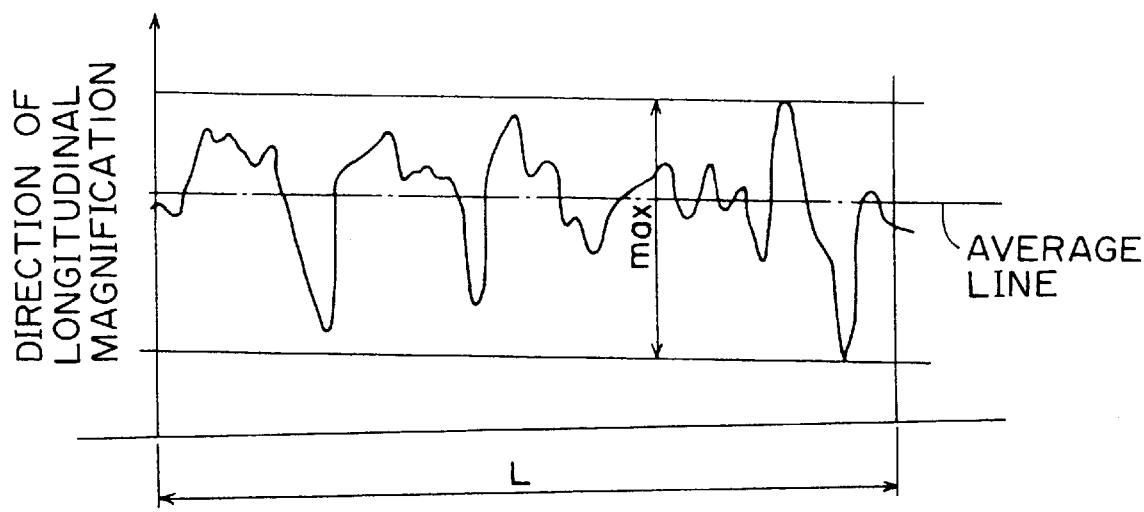
FIG. 13 is a graph for describing the definition of surface roughness (Ra)

Accordingly, the abrasion of the sliding-contact surface between the die 52 of the drawing die and the punch 53 shown in FIG. 12 is reduced by the lubricating oil 20. Therefore, the life of the die and the punch can be prolonged.

In addition, owing to the reduction of abrasion coefficient, drawing process can be accomplished at a high speed.

Because lubricating performance is improved, when the sheet 10 is processed into the battery can by drawing and ironing processing, the life of the die 52 can be prolonged. That is, supposing that 300,000 battery cans are drawn and ironed a day, the die 52 is replaced every six days whereas conventionally, the die 52 is replaced every four days.

The present invention is not limited to the above embodiments, but various modifications can be made. For example, the surface roughness of the sheet 10 may be made to be great after the steel plate 11 is plated with nickel.

That is, both surfaces of the steel plate 11 are nickel-plated without roughening the surface thereof in cold rolling. Then, refining rolling is carried out by a dull roll having a surface roughness of 0.5 $\mu$m–1.2 $\mu$m so that the surface roughness of each nickel-plated layer has a surface roughness of 0.5 $\mu$m–1.2 $\mu$m.

Consequently, the roughness-increased surface of the steel plate allows a larger amount of lubricating oil to be applied thereto and functions as an oil reservoir. Accordingly, lubricating oil is held on the surface of the steel plate even in blanking and drawing processes, thus reducing the friction coefficient of the sliding-contact surface between the die and the punch.

As apparent from the foregoing description, according to the present invention, a cold-rolled steel plate having nickel-plated layers formed on both surfaces thereon is drawn and ironed into a cylindrical battery can which is open in the upper end thereof. The elongation coefficient of the steel plate is uniform in the lengthwise direction, the widthwise direction perpendicular to the lengthwise direction, and the oblique direction thereof. Therefore, in drawing and ironing a sheet comprising the steel plate, earring can be prevented from being generated at the upper end of the wall of the battery can and hence, the sheet can be processed into the battery can at a high yield and the battery can can be manufactured at a low cost. In addition, the durability of a drawing can be prolonged.

The plated layer is formed on the upper and lower surface of the very low carbon steel plate containing carbon at less than 0.009 wt %. Therefore, the sheet can be maintained without giving rise to yield point elongation. Stretcher strain is not generated on the battery can processed from the sheet by drawing and ironing processing. Thus, the battery can looks fine.

Continuous annealing performed subsequent to cold rolling reduces manufacturing period of time, thus reducing manufacturing cost. In particular, the continuous annealing of the very low steel plate having plated layers on the upper and lower surfaces thereof reduces manufacturing period of time and manufacturing cost because the steel plate and the plated layers are simultaneously annealed.

In the continuous annealing, heat is uniformly distributed to the steel plate and it is unnecessary to form a film on the surface of the steel plate. Therefore, the surfaces of the steel plate can be prevented from being deteriorated and hence battery cans be manufactured at a high yield.

The hard nickel-plated layer is formed on the surface of the sheet to be disposed on the inner surface of the cylindrical wall of the battery can. Therefore, in drawing the sheet, the hard nickel-plated layer is cracked randomly lengthwise, widthwise, and obliquely. That is, wedge-shaped cracks are formed in the hard nickel-plated layer. Consequently, the surface area of the inner surface of the battery can be increased and thus contact resistance of the inner surface of the battery can to filler is reduced, thus improving the electrical performance of the battery can.

The bright nickel-plated layer is formed on the surface of the steel plate to be disposed on the outer surface of the cylindrical wall of the battery can. The surfaces of the Fe—Ni diffusion layers are made to be bright by adjusting pressure-reducing percentage to an appropriate value in refining rolling. Thus, the battery can looks fine. Further, the thin Fe—Ni diffusion layers are formed on both surfaces of the cold-rolled plate so that the battery can is corrosion-resistant and has a superior electrical performance.

In addition, because the metal of the nickel-plated layers formed on both surfaces of the steel plate has a granular structure, the nickel-plated layers have a preferable ductility and thus are resistant to being curved. Therefore, the battery can is corrosion-resistant.

The metal of the steel plate can be allowed to have a granular structure owing to the continuous annealing performed subsequent to the plating process. Therefore, the elongation degree of the plated steel plate can be allowed to be more than a required value, and the difference between the elongations in the lengthwise, widthwise, and the oblique directions of the steel plate can be made to be less than a predetermined value. Accordingly, the thickness of the sheet can be favorably reduced in drawing and ironing process and in addition, earring can be prevented from being generated on the upper end of the cylindrical wall of the battery can.

Therefore, battery cans can be manufactured at a high yield and thus at a low cost.

The steel plate is cold-rolled at a rolling percentage of 80–90 depending on the kind of steel so that the in-plane anisotropy $\Delta r$ is less than 0.15. The axes of a pair of work rolls which contacts the steel plate being cold-rolled form a predetermined angle so as to make the thickness of the steel plate uniform in the width direction thereof. Therefore, in drawing and ironing the sheet comprising the steel plate, earring can be prevented from being generated at the upper end of the wall of the battery can and hence, the sheet can be processed into the battery can at a high yield and the battery can can be manufactured at a low cost.

In the conventional material of the battery can, the difference between the highest portion and the lowest portion of the cylindrical wall of the battery can is approximately 5 mm. Thus, it is necessary to cut the wall by this length therefrom. As a result, the height of the battery can is 52 mm, whereas in the sheet according to the present invention, the difference between the highest portion and the lowest portion of the cylindrical wall of the battery can is approximately 2 mm. As a result, the height of the battery can is 55 mm, i.e., the battery can according to the present invention is longer than the conventional battery can by 5.45%.

Both sides of heat-rolled slab is heated in the width direction thereof by the heating means. As a result, the metallic structure on both sides of the plate formed in the cold rolling and refining rolling is composed of equiaxial grains in the width direction thereof.

The surface roughness of the sheet is high by 5–10 times as large as that of the conventional sheet. Therefore, the roughness-increased surface of the steel plate allows a larger amount of lubricating oil to be applied thereto and functions as an oil reservoir. Accordingly, lubricating oil can be held on the surface of the steel plate even in blanking and drawing processes, thus reducing the friction coefficient of the sliding-contact surface between the die and the punch.

Consequently, the die and that of the punch are durable and the sheet can be deep-drawn at a high speed due to the reduction of the friction coefficient of the sliding-contact surface between the die and the punch.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A battery can, which is cylindrical and open in one end thereof and formed by drawing and ironing, comprising a cylindrical wall and a bottom surface disposed at the other end thereof, in which the cylindrical wall and the bottom surface are composed of a steel plate which comprises a cold-rolled steel plate having a plated layer formed on each major surface thereof, in which the plated steel sheet has in-plane anisotropy $\Delta r$ of less than $\pm 0.15$, representing the difference among Lankford values (r), where $$\Delta r = (r_x + r_y)/2 - r_z$$

in which $r_x$ is a width deformation degree in a lengthwise direction thereof/a thickness deformation degree in the lengthwise direction thereof, $r_y$ is a width deformation degree in a widthwise direction thereof/a thickness deformation degree in the widthwise direction thereof, and $r_z$ is a width deformation degree in an oblique direction thereof/a thickness deformation degree in the oblique direction thereof.

2. The battery can as defined in claim 1, wherein the plated steel sheet has a Lankford value for each of $r_x$, $r_y$ and $r_z$ of more than 1.2.

3. The battery can as defined in claim 1, wherein all metallic structure of the steel plate is composed of equiaxial grain.

4. The battery can as defined in claim 1, wherein the plated layer is Ni plated layer.

5. The battery can as defined in claim 1, wherein a metallic structure of the plated layer is composed of granular structure.

6. The battery can as defined in claim 5, wherein the plated layer is Ni plated layer.

7. The battery can as defined in claim 1, wherein the plated layers are formed on both surface of the steel plate via steel metal-plated metal diffusion layers.

8. The battery can as defined in claim 7, wherein the plated layers are Ni plated layers and the diffusion layers are Fe-Ni diffusion layers.

* * * * *